United States Patent [19]

Hayashi et al.

[11] Patent Number: 4,916,897
[45] Date of Patent: Apr. 17, 1990

[54] EXHAUST GAS PURIFYING APPARATUS BUILT-IN TO A MUFFLER FOR A DIESEL ENGINE

[75] Inventors: Kotaro Hayashi, Susono; Tokuta Inoue, Mishima; Sumio Ito, Gotenba; Kiyoshi Kobashi, Mishima; Shinichi Takeshima, Susono, all of Japan

[73] Assignee: Toyota Jidosha Kabushiki Kaisha, Aichi, Japan

[21] Appl. No.: 291,273

[22] Filed: Dec. 28, 1988

[30] Foreign Application Priority Data

Jan. 8, 1988 [JP] Japan .................................. 63-1169
Mar. 28, 1988 [JP] Japan .......................... 63-39617[U]
Mar. 28, 1988 [JP] Japan .......................... 63-39618[U]
Apr. 5, 1988 [JP] Japan .......................... 63-45289[U]
Apr. 30, 1988 [JP] Japan .............................. 63-105431

[51] Int. Cl.⁴ .............................................. F01N 3/02
[52] U.S. Cl. .................................. 60/286; 55/276; 55/283; 55/302; 55/466; 55/DIG. 30; 60/296; 60/303; 60/311; 181/231; 181/254
[58] Field of Search ................. 60/303, 286, 296, 311; 55/278, 283, 302, 466, DIG. 30; 181/231, 254, 277, 225

[56] References Cited

U.S. PATENT DOCUMENTS 3,110,300 11/1963 Brown ................................... 60/288
3,841,841 10/1974 Torosian ............................... 55/276
4,264,344 4/1981 Ludecke ............................... 55/314
4,759,781 7/1988 Olson .................................... 55/273

FOREIGN PATENT DOCUMENTS 57-63106 4/1982 Japan .
180715 10/1983 Japan ..................................... 60/288
61-223215 10/1986 Japan .
62-178708 8/1987 Japan .
62-210212 9/1987 Japan .

Primary Examiner—Douglas Hart
Attorney, Agent, or Firm—Oliff & Berridge

[57] ABSTRACT

An exhaust gas purifying apparatus comprising a first and a second casings having expansion chambers, respectively, a third casing arranged between the first and second casings to form a passage therebetween, an inlet pipe introducing the exhaust gas into the first expansion chamber, and an outlet pipe discharging the exhaust gas from the second expansion chamber, whereby a muffler is constituted. The apparatus also comprises a filter arranged in the third casing to trap particulates in the exhaust gas, and a heater arranged adjacent to the filter on the side of the second expansion chamber to burn the particulates deposited on the filter, to regenerate the filter. A flow control unit, comprising a bypass and a valve therein, is arranged such that the exhaust gas normally flows through the filter and the heater, and when the filter is regenerated, at least a part of the exhaust gas flows in reverse through the heater and the filter. This exhaust gas purifying apparatus is built into the muffler.

24 Claims, 23 Drawing Sheets

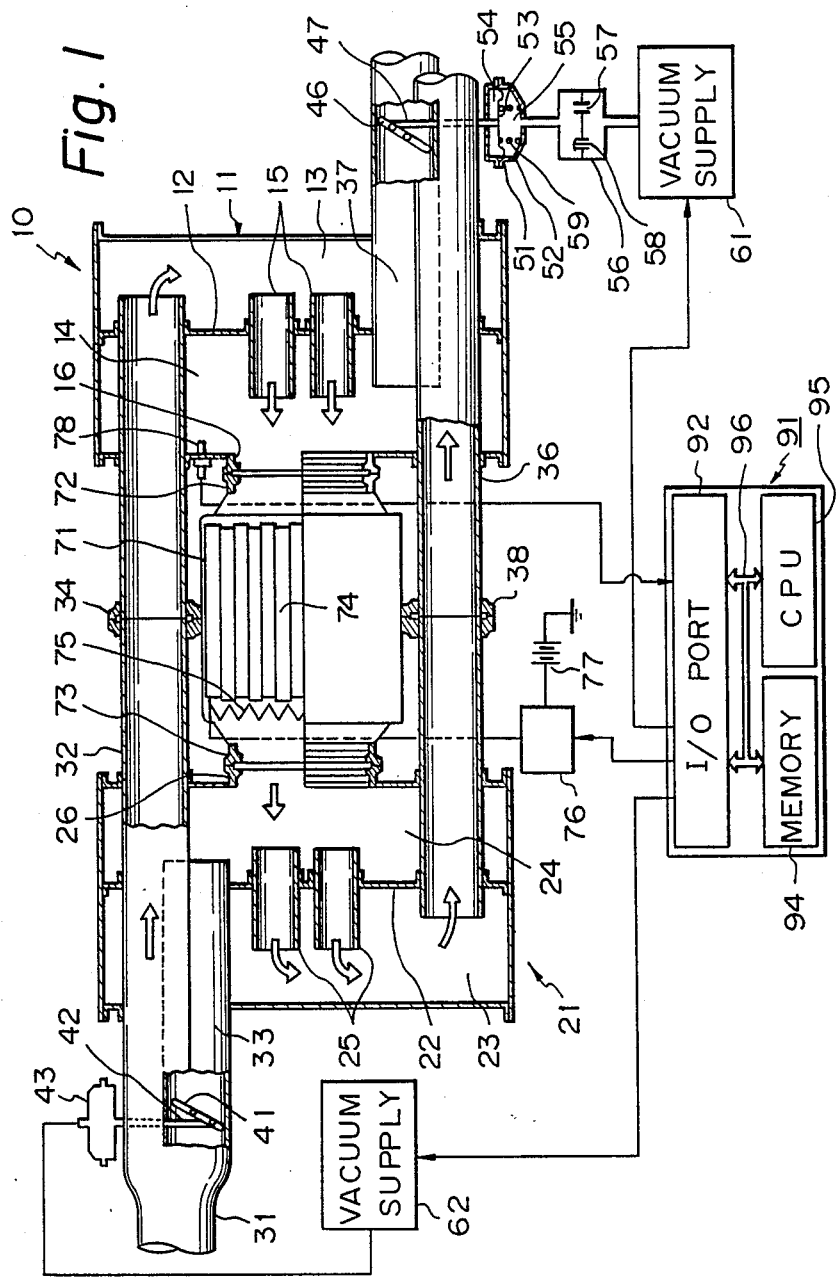

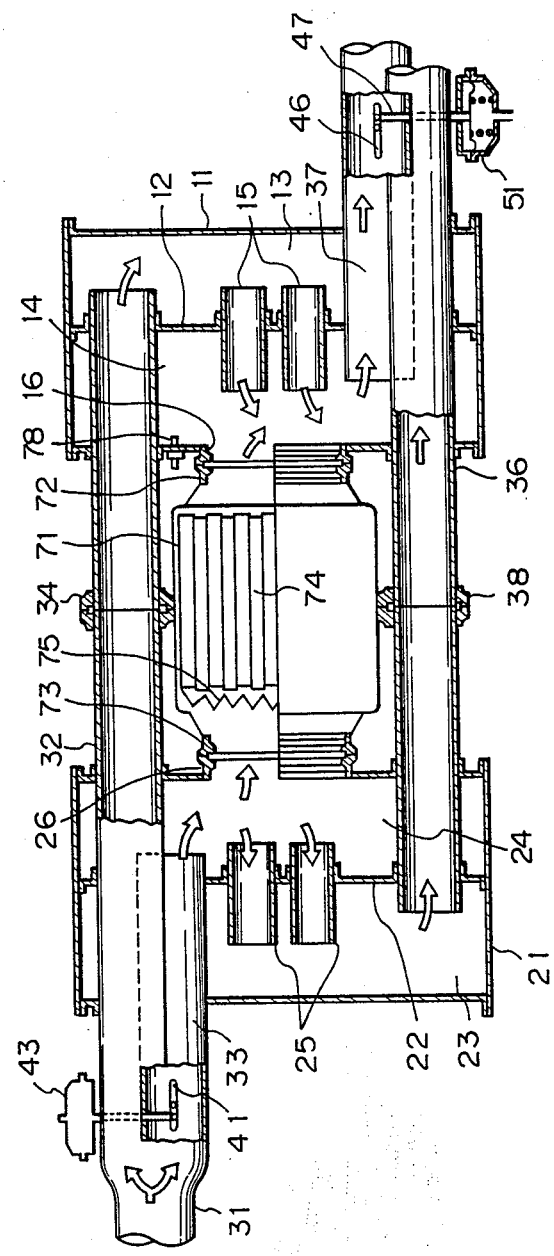
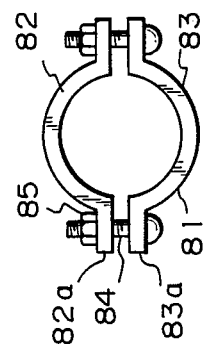
Fig. 3
Fig. 2

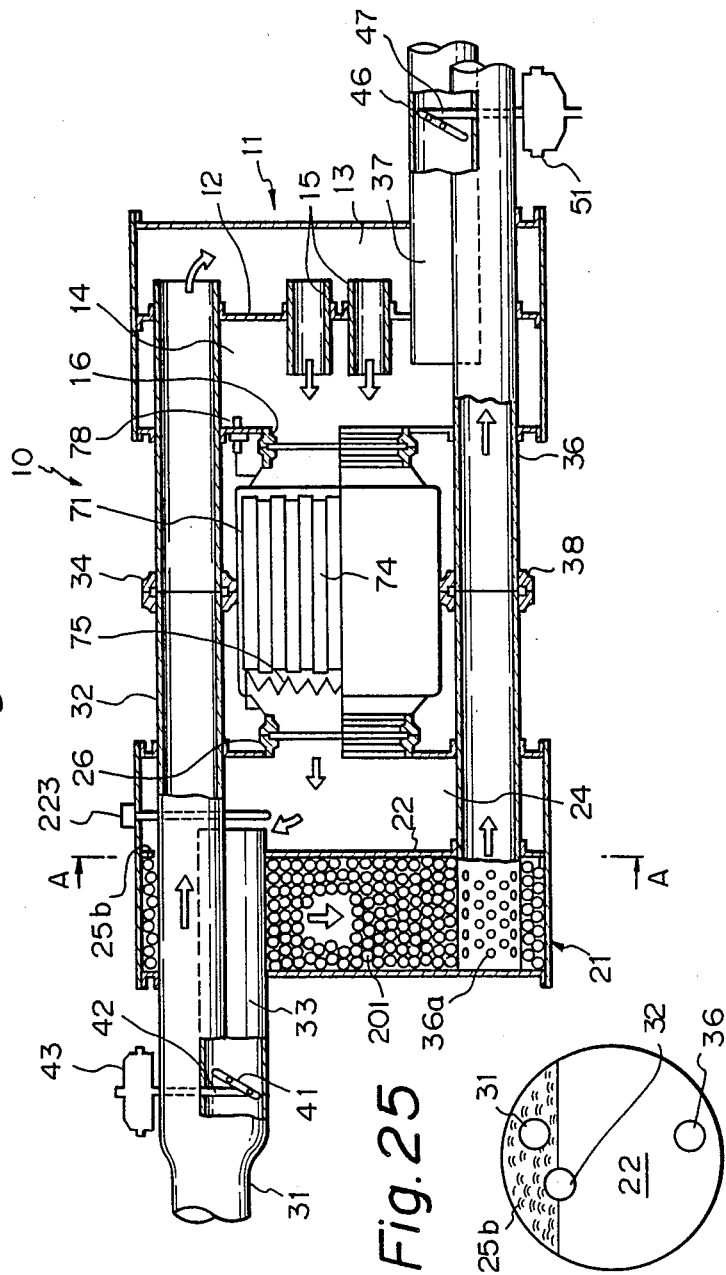

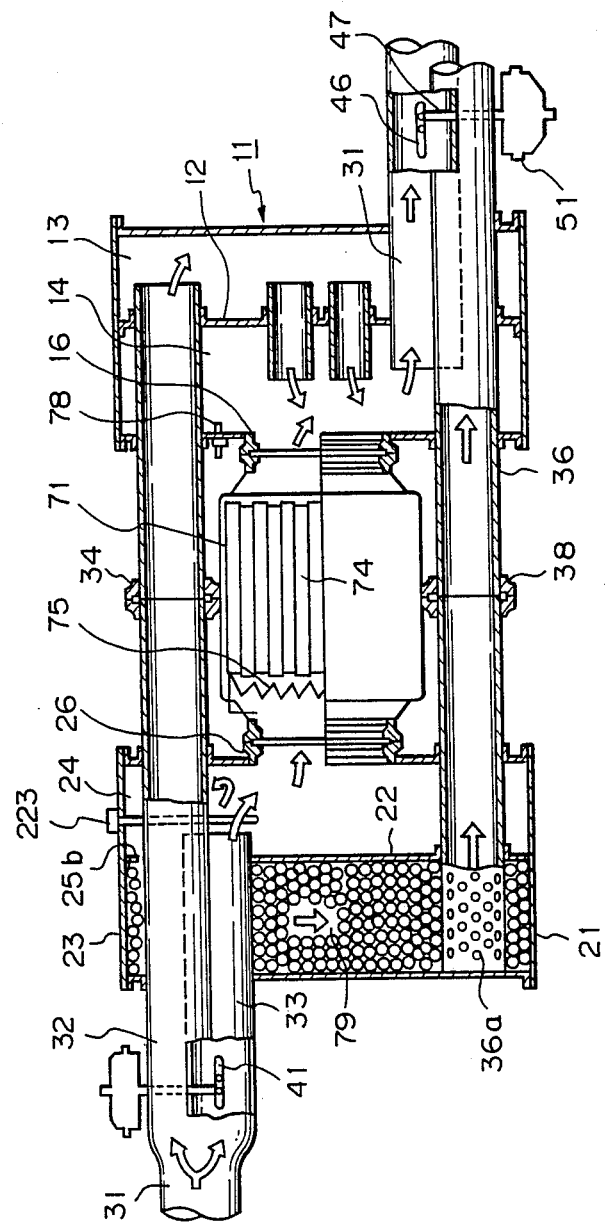

EXHAUST GAS PURIFYING APPARATUS BUILT-IN TO A MUFFLER FOR A DIESEL ENGINE

BACKGROUND OF THE INVENTION

1. Field of the Invention

The present invention relates to an exhaust gas purifying apparatus built-in to a muffler for a diesel engine, in which the exhaust gas normally flows through a filter in one direction and flows through the filter in the reverse direction when a regeneration of the filter is required.

2. Description of the Related Art

Japanese Unexamined Patent Publication Nos. 61-223215 and 62-210212 disclose an exhaust gas purifying apparatus having a filter comprising a ceramic honeycomb filter element arranged in the exhaust passage of the diesel engine to trap particulates, such as unburned hydrocarbon components, contained in the exhaust gas to prevent pollution of the atmosphere.

The filter traps the particulates by deposition on the filter element therein, and thus the filter element becomes clogged after long use. Therefore, the filter must be regenerated cyclically. The above publications disclose an arrangement of a heating means which comprises an electric heater adjacent to the filter, wherein the heater is cyclically activated to burn combustible particulates deposited on the filter element, such as unburned hydrocarbon components, to thereby regenerate the filter. For the regeneration of the filter, it is considered advantageous to arrange the heater downstream of the filter in the direction of the normal flow of the exhaust gas, and to cause the air containing exhaust gas to flow in a reverse direction through the filter, so that the burning flame is propagated toward the normal inlet side of the filter at which the particulates are deposited. To cause the reverse flow, the above publications disclose an arrangement of bypass pipes bypassing the filter accommodating main pipe, and bypass control valves in the bypass pipes.

The problem of the above described exhaust gas purifying apparatus is the provision of bypass pipes in addition to the filter accommodating main pipe, since this provision means that the apparatus must be large, and the mounting of such a large apparatus to the vehicle is cumbersome.

SUMMARY OF THE INVENTION

An object of the present invention is to provide an exhaust gas purifying apparatus built-in to a muffler for a diesel engine, which can be constructed in a compact size and thus can be easily mounted to the vehicle.

According to the present invention, there is provided an exhaust gas purifying apparatus built-in to a muffler for a diesel engine, said apparatus comprising: a first casing having a first expansion chamber formed therein; a second casing having a second expansion chamber formed therein in series with the first expansion chamber; a third casing arranged between the first and second casings to form a passage between the first and second expansion chambers; an inlet pipe for introducing an exhaust gas from the engine into the first expansion chamber; an outlet pipe for discharging the exhaust gas from the second expansion chamber to the outside atmosphere; a filter arranged in the third casing to trap particulates in the exhaust gas flowing therethrough; an igniting means arranged adjacent to the filter on the side of the second expansion chamber, to burn the particulates deposited on the filter and thereby regenerate the filter; and a flow control means arranged such that the exhaust gas normally flows from the first expansion chamber through the filter means to the second expansion chamber, and when the filter means is regenerated at least a part of the exhaust gas is introduced from the inlet pipe means into said second expansion chamber and flows in reverse from the second expansion chamber through said filter to the first expansion chamber, to be discharged therefrom; whereby the first and second casings constitute a muffler and the exhaust gas purifying apparatus is built-in to the muffler.

The inventors found that the exhaust gas may be passed along a serpentine path in many mufflers in the exhaust system in the engine, and the exhaust gas at least in part may be made to flow in reverse in the mufflers. In this aspect, it is advantageously possible to construct an exhaust gas purifying apparatus in which a reverse flow is established during the regeneration of the filter by the structure built-in to the muffler. In this arrangement, the exhaust gas purifying apparatus can be substantially accommodated in the muffler, and therefore, no extra space will be required for the exhaust gas purifying apparatus other than the fundamental space used in the muffler.

Typically, the first expansion chamber is located at the rear of the muffler when mounted in the vehicle and the second expansion chamber is located at the front thereof. Therefore, the inlet pipe extends through the muffler and terminates at the rear of the muffler. The outlet pipe starts from the front of the muffler and extends rearward, and thus the main passage in the muffler extends from the rear to the front of the muffler, where the filter is located.

Preferably, the flow control means comprises an inlet bypass conduit connecting the inlet pipe to the second expansion chamber, preferably at the front of the muffler, with an inlet control valve arranged therein, an exhaust bypass conduit connecting the first expansion chamber, preferably at the rear of the muffler, to one of the outlet pipe and the outside atmosphere, with an exhaust control valve arranged therein, and a control means causing the inlet control valve and the exhaust control valve to be normally closed and to be opened when the filter is to be regenerated. With this arrangement, the exhaust gas flows normally from the rear to the front of the muffler and in reverse from the front to the rear thereof, so that the inlet bypass conduit and the exhaust bypass conduit can be very short and simple.

BRIEF DESCRIPTION OF THE DRAWINGS

The other objects and features of the present invention will become more apparent from the following description of the preferred embodiments with reference to the accompanying drawings, in which:

FIG. 1 is a sectional view of an exhaust gas purifying apparatus built-in to a muffler according to the first embodiment of the present invention;

FIG. 2 is a front view of the clamp of FIG. 1;

FIG. 3 is a sectional view of the apparatus of FIG. 1 in the filter regeneration condition;

FIG. 24 is a sectional view of an exhaust gas purifying apparatus according to the eleventh embodiment of the present invention;

FIG. 25 is a sectional view of a smell absorbent-containing separating wall, taken along the line A—A of FIG. 24;

FIG. 26 is a sectional view of the apparatus of FIG. 25 in the filter regeneration condition;

DESCRIPTION OF THE PREFERRED EMBODIMENTS

Figure 4:
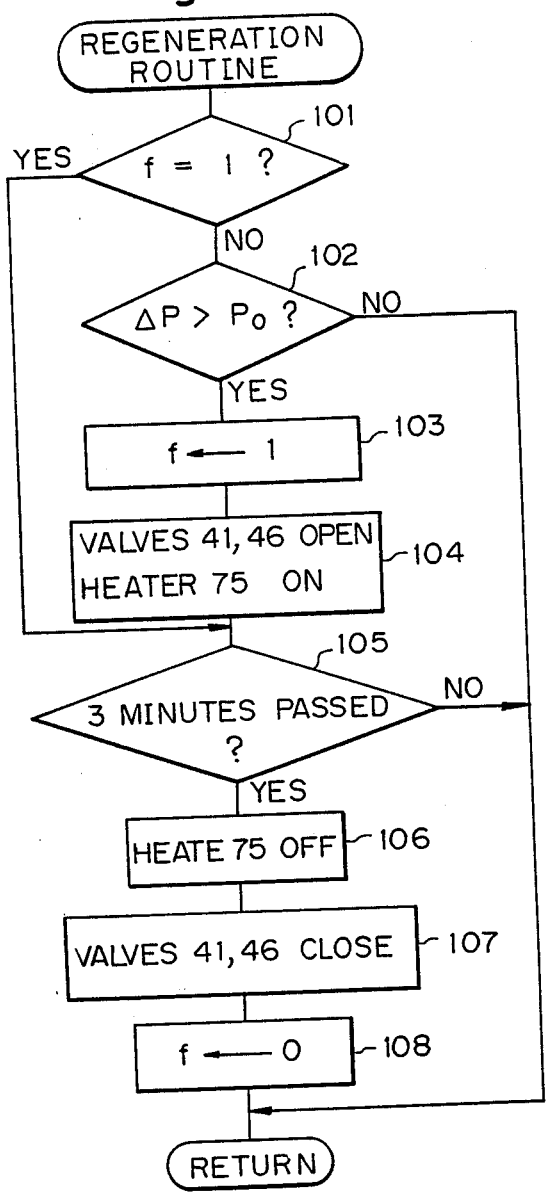
FIG. 4 is a flow chart of the filter regeneration routine carried out by the apparatus of FIG. 1.

There are many embodiments shown in the drawings, and therefore, the same reference numerals are used to show similar elements throughout all of these embodiments.

FIGS. 1 to 3 show an exhaust gas purifying apparatus built-in to a muffler 10 according to the first embodiment of the present invention. The muffler 10 includes a first casing 11 having a first expansion chamber formed therein, which is separated into two expansion chambers 13 and 14 by a separating wall 12. A plurality of small pipes 15 interconnects these two expansion chambers 13 and 14 to provide the inherent function of the muffler 10. The muffler 10 also includes a second casing 21 having a second expansion chamber formed therein, which is also separated into two expansion chambers 23 and 24 by a separating wall 22 having a plurality of small pipes 25. In this embodiment, the first and second casings 11 and 12 are arranged in line and spaced apart. A third casing 71 is arranged between the first and second casings 11 and 21 to form a passage therebetween and to mechanically connect same as a unit. Hereinafter, chamber 13 and 23 are referred to as remote side chambers and chambers 14 and 24 are referred to as near side chamber, to clarify the description.

An inlet pipe 31 extends from an exhaust manifold (not shown) in the engine and is branched into a main inlet pipe 32 and an inlet bypass pipe 33 near the second casing 21. The main inlet pipe 32 extends through the second casing 21 and through the separating wall 12 of the first casing 11 to the first remote expansion chamber 13 of the first casing 11, and thus introduces the exhaust gas into the first expansion chamber. The inlet bypass pipe 33 extends through the separating wall 22 of the second casing 21 to the second near side expansion chamber 24 of the second casing 21.

A main outlet pipe 36 extends from the second remote side expansion chamber 23 through the separating wall 22 of the second casing 21 and through the first casing 11 to the outside atmosphere. An exhaust bypass pipe 37 extends from the first near side expansion chamber 14 through the separating wall 12 of the first casing 11 to the outside atmosphere.

An inlet control valve 41 is arranged in the inlet bypass pipe 33 and connected to an actuator 43 through a rod 42. The inlet control valve 41 normally closes the inlet bypass pipe 33 and opens same when the filter is to be regenerated, as described in detail later. An exhaust control valve 46 is arranged in the exhaust bypass pipe 37 and connected to an actuator 51 through a rod 47. Similarly, the exhaust control valve 46 normally closes the exhaust bypass pipe 37 and opens same when the filter is to be regenerated.

The actuators 43 and 51 are a similar type of vacuum operated diaphragm actuators, and thus only one actuator is described in detail. The actuator 51 comprises a shell 52 and a diaphragm 53 arranged therein to form a constant pressure chamber 54 and a vacuum chamber 55. The diaphragm 53 is connected to the exhaust control valve 46 through the rod 47. The constant pressure chamber 54 is normally communicated with the atmosphere and the vacuum chamber 55 is connected to a vacuum supply means 61 through a vacuum delayed transmitting means 56. A spring 59 is arranged in the vacuum chamber 55. The vacuum delayed transmitting means 56 comprises an orifice 57 and a check valve 58, so that the vacuum is gradually introduced into the vacuum chamber 55 by closing the check valve 58 and the atmospheric pressure (the release of the vacuum) is rapidly introduced by opening the check valve 58.

When the atmospheric pressure is introduced into the vacuum chamber 55, the diaphragm 53 is displaced toward the constant pressure chamber 54 by the spring 59, to close the exhaust control valve 46. Conversely, when the vacuum is introduced into the vacuum chamber 55, the diaphragm 53 is displaced toward the vacuum chamber 55 with the spring 59 compressed to open the exhaust control valve 46. The actuator 43 for the inlet control valve 41 is directly connected to a vacuum supply means 62 and does not pass through the vacuum delayed transmitting means, and opens the inlet control valve 41 when the vacuum is introduced and closes same when the atmospheric pressure is introduced.

The third casing 71 has open ends 72 and 73 which are mounted against a cylindrical flange 16 of the first casing 11 and a cylindrical flange 26 of the second casing 21, respectively. A releasable connection between these casings can be made by a clamp 81, as shown in FIG. 2. The clamp 81 comprises a pair of semicircular clamp members 82 and 83 with end flanges 82a and 83a. A bolt 84 is passed through the end flanges 82a and 83a and engaged with a nut 85. Further, the main inlet pipe 32 and the main outlet pipe 36 extend outside of the third casing 71 between the first casing 11 and the second casing 21 and have joints 34 and 38, respectively. These joints 34 and 38 can be releasably formed by using the clamp 81.

A filter element 74 is arranged in the third casing for trapping particulates in the exhaust gas, and an electric heater 75 is arranged adjacent to the filter element 74 on the side of the second near side expansion chamber 24 formed in the second casing 21, to burn the particulates deposited on the filter element 74 and thereby regenerate the filter element 74. The heater 75 is connected to a battery 77 through a relay 76 by which a voltage is applied to the heater 75 when particulates are deposited on the filter element 74 to a predetermined extent. The extent of the deposited particulates can be detected by a pressure sensor 78 arranged in the first near side expansion chamber 14 in the first casing 11. This enables a determination that the particulates are deposited on the filter element 74 to the predetermined extent when the pressure becomes higher than a predetermined value.

Normally, the inlet control valve 41 and the exhaust control valve 46 close the inlet bypass pipe 33 and the exhaust bypass pipe 37, respectively, as shown in FIG. 1, to trap the particulates in the exhaust gas. Therefore, the exhaust gas is introduced from the main inlet pipe 32 into the first remote side expansion chamber 13 and flows therefrom through the first near side expansion chamber 14 into the filter element 74, as indicated by the arrow in FIG. 1. The passage of the exhaust gas through the filter element 74 cause the particulates to be trapped in the filter element 74. After passing through the filter element 74, the exhaust gas flows through the second near side and the remote side expansion chambers 23 and 24 and is discharged to the outside atmosphere.

Also, the noise from the exhaust gas is silenced by passing same through the expansion chambers 13, 14, 23, and 24 of the muffler 10.

When the filter element 74 is to be regenerated the inlet control valve 41 and the exhaust control valve 46 open the inlet bypass pipe 33 and the exhaust bypass pipe 37, respectively, as shown in FIG. 3, and thus the exhaust gas flows through the main inlet pipe 32 and the inlet bypass pipe 33, as indicated by the arrow in FIG. 3. A portion of the exhaust gas that flows through the main inlet pipe 32 is introduced into the first remote side expansion chamber 13 and flows therefrom through the first near side expansion chamber 14 into the exhaust bypass pipe 37, from which the exhaust gas is discharged to the outside atmosphere. Another portion of the exhaust gas that flows through the inlet bypass pipe 33 is introduced into the second near side expansion chamber 24, where the flow of the exhaust gas is further branched into a portion that flows through the filter element 74 and another portion that flows through the second remote side expansion chamber 23 and the main outlet pipe 36 to the outside atmosphere. Note, the direction of the flow of the exhaust gas that flows through the filter element 74 during the regeneration of the filter element 74 is the reverse of that of the normal trapping flow. Simultaneously, a voltage is applied to the electric heater 75, which then generates heat to burn the particulates deposited on the filter element 74.

For this regeneration process, the apparatus is designed so that a rate of the exhaust gas that flows through the filter element 74 is about one-tenth of the total exhaust gas. For example, the inlet control valve is open to a predetermined extent so that about half of the total exhaust gas flows through the main inlet pipe 32 and half through the inlet bypass pipe 33, respectively. Also, four-tenths and six-tenths of the total exhaust gas flow through the main outlet pipe 36 and the exhaust bypass pipe 37, respectively. Therefore, almost all of the exhaust gas passes through only two stages of the four stages of the expansion chambers, but the noise reduction effect in this condition is not as good as that in the normal condition. About one-tenth of the total exhaust gas that flows through the filter element 74 during the regeneration thereof is used to prevent the electric heater 75 from being cooled by the exhaust gas, to ensure a stable burning of the particulates and to prevent the particulates from being blown off the filter element 74.

Also, during the regeneration process, the vacuum delayed transmitting means 56 causes the vacuum to be gradually transmitted to the exhaust control valve 46, which thus is opened gradually. Therefore, the level of the exhaust noise is not suddenly changed, and thus the driver does not suffer any discomfort.

An electronic control unit (ECU) 91 is provided to control the operation of the inlet control valve 41, the exhaust control vale 46, and the electric heater 75. The ECU 91 comprises an input and output (I/O) port 92, a memory 94, and a central processing unit (CPU) 95, with a bus 96 interconnecting these components. The pressure sensor 92, the vacuum supply means 61 and 62, and the relay 76 are connected to the I/O port 92.

FIG. 4 is a flow chart of the regeneration routine of the filter element carried out by the ECU 91. This routine is started by interruptions at predetermined time intervals.

At step 101, it is determined whether or not a flag f is set to 1. The flag f is set to 1 when the filter element 74 is to be regenerated and rest to 0 during a normal filtering operation. Therefore, in the normal operation of the apparatus, the program proceeds to step 102 and it is determined whether the pressure $\Delta P$ detected by the pressure sensor 92 is greater than a predetermined value $P_0$. If the amount of particulates deposited on the filter element 74 is relatively low, the detected pressure $\Delta P$ is smaller than the predetermined mined value $P_0$, and thus the program skips the steps 103 to 108 and ends the routine of that cycle. If the detected pressure $\Delta P$ reaches the predetermined value $P_0$, due to an increase of the deposited particulates, the program proceeds from step 102 to step 103 to start the regeneration of the filter element 74.

At step 103, the flag f is set to 1, and then at step 104, the inlet control valve 41 and the exhaust control valve 46 are opened, and a voltage is applied to the electric heater 75. The inlet control valve 41 is opened instantaneously, but the exhaust control valve 46 is opened gradually by the action of the vacuum delayed transmitting means 56, as described above. The electric heater 75 then generates heat, to burn the particulates deposited on the filter element 74. Then at step 105, it is determined whether three minutes has passed since the activation of the electric heater 75. At the cycle when the regeneration of the filter element 74 is started, three minutes has not passed, and thus the program skips steps 106 to 108 and ends the routine of that cycle. At cycles following the start of the regeneration of the filter element 74, the program proceeds from step 101 directly to step 105, since the flag f is set to 1, and the determination at step 105 is repeated until three minutes has passed. When three minutes has passed, the program proceeds from step 105 to step 106 to stop the supply of voltage to the electric heater 75, and then at step 107, the inlet control valve 41 and the exhaust control valve 46 are closed. Finally, at step 108, the flag f is reset to 0 and the routine is ended.

As will be apparent, the filter element 74 is arranged between the first casing 11 and the second casing 21 of the muffler 10 in the first embodiment of the present invention and is intended to trap particulates while using the reverse flow of the muffler 10 relative to the flow of the main inlet pipe 32. Therefore, it is possible to cause a reverse flow through the filter element 74 without the need for other special pipings for the regeneration of the filter element 74. As a result, the exhaust gas purifying apparatus according to the present invention can be made very compact and can be easily mounted to the vehicle. Also, the path of the exhaust gas is simple, and thus there is a small flow resistance with less loss of exhaust gas pressure.

Also, the first casing 11 and the second casing 21 are interconnected by the main inlet pipe 32 and the main outlet pipe 36, which are welded to the separating walls 12 and 22, respectively. Therefore, it is not necessary to reinforce the connections of the third casing 71 to the first casing 11 and the second casing 21. In this regard, the third casing 71 can be connected to the first casing 11 and the second casing 21 by the simple clamp 81, as shown in FIG. 2, to thereby enable an easy replacement of the filter element 74. Also, the main inlet pipe 32 and the main outlet pipe 36 have joints 34 and 38, respectively, which can be interconnected by using the clip 81, and therefore, the main inlet pipe 32 and the main outlet pipe 36 can be easily replaced.

Also, the filter element 74 is built-in to the muffler 10, and thus located at the rearmost point of the exhaust system. The temperature of the exhaust gas is relatively low at the rearmost point of the exhaust system, and thus the particulates can be effectively trapped. Also, if the particulates are deposited on the muffler 10 and blown off by the exhaust gas, such blown off particulates are trapped again on the filter element 74, resulting in an increased exhaust gas purification.

Figure 5:
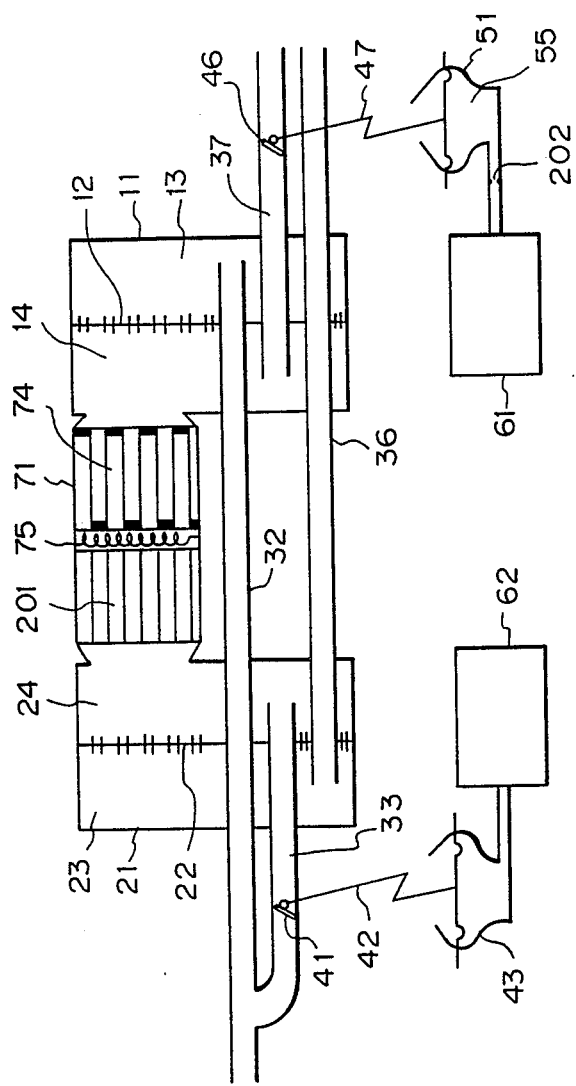
FIG. 5 is a schematic view of an exhaust gas purifying apparatus with a smell absorbent incorporated therein according to the second embodiment of the present invention.

FIG. 5 shows the second embodiment of the present invention, in which a monolithic type smell absorbent 201 is arranged in the third casing 71 to trap unpleasant odors in the exhaust gas, in addition to the filter element 74 for trapping particulates. The smell absorbent 201 is arranged on the side of the second casing 21 from the filter element 74 and the electric heater 75 is arranged between the filter element 74 and the smell absorbent 201. The smell absorbent 201 is preferably formed of sepiolite or zeolite and can carry a catalyst to oxidize the unpleasant odor components. Note, a restriction 202 is provided in the conduit between the vacuum chamber 55 of the actuator 51 and the vacuum supply means 61, and the vacuum delay transmitting means 56 of the first embodiment is omitted in this second embodiment. The other arrangements are similar to those of the first embodiment.

The operation of the second embodiment is similar to that of the first embodiment, except for the provision of the smell absorbent 201. In summary, the inlet control valve 41 and the exhaust control valve 46 are normally opened and the exhaust gas flows from the main inlet pipe 32 through the first casing 11, the filter element 74, the smell absorbent 201, the second casing 21, and the main outlet pipe to the outside atmosphere, whereby noise is reduced and particulates and unpleasant odors are trapped. The smell absorbent 201 is located downstream of the filter element 74, so that particles harmful to the smell absorbent 201, such as the particulates in the exhaust gas, metal components in the engine lubricating oil, and others, are trapped by the filter element 74 and are not carried on to the smell absorbent 201. Therefore, the operating life of the smell absorbent 201 is prolonged.

The regeneration of the filter element 74 is carried out in the same way as in the first embodiment, by opening the inlet control valve 41 and the exhaust control valve 46 and applying a voltage to the electric heater 75. During this regeneration operation, the regenerating exhaust gas flows in reverse from the smell absorbent 201 to the filter element 74.

The regeneration of the smell absorbent 201 can be carried out independently of the regeneration of the filter element 74. In this regeneration of the smell absorbent 201, the exhaust control valve 46 is opened while the inlet control valve 41 is closed, and the electric heater 75 is activated to generate heat. Accordingly, the temperature of the exhaust gas is increased, and thus the unpleasant odor components absorbed or deposited on the smell absorbent 201 are released therefrom or are burned. When the regeneration is completed, the electric heater 75 is deactivated and the exhaust control valve 46 is closed. The exhaust control valve 46 is moved gradually when being opened or closed, since the vacuum transmission is delayed due to the restriction 202. Note, the regeneration of the filter element 74 is carried out preferentially to but less often than that of the smell absorbent 201.

Figure 6:
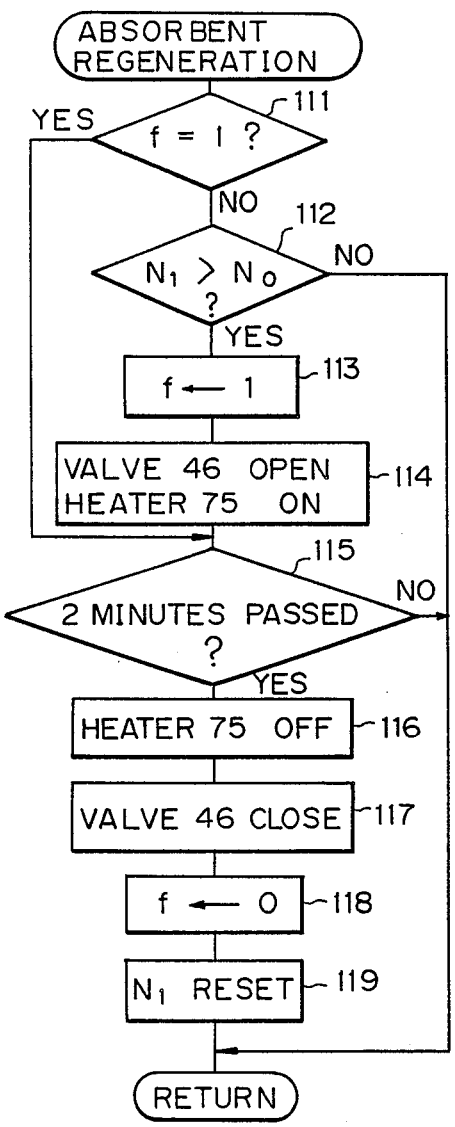
FIG. 6 is a flow chart of the absorbent regeneration routine carried out by the apparatus of FIG. 5.

FIG. 6 is a flow chart of the regeneration routine of the smell absorbent 201 controlled by the ECU (refer to FIG. 1). This routine is started by an interruption at predetermined time intervals, as in the regeneration routine of the filter element 74.

At step 111, it is determined whether or not a flag f is set to 1. In this case, the flag f is set to 1 when the smell absorbent is regenerated, and as in the filter regeneration routine, the program proceeds to step 112, since the flag f is reset to upon a normal operation of the apparatus. At step 112, it is determined whether the integration value of the engine revolution $N_1$ is greater than a predetermined value $N_0$. If the amount of unpleasant odor components trapped on the smell absorbent 201 is relatively small, the integration revolution value $N_1$ is smaller than the predetermined value $N_0$, and thus the program is ended. If the integration revolution value $N_1$ is greater than the predetermined value $N_0$, it is determined that a large amount of the unpleasant odor components has been trapped, and thus the regeneration of the smell absorbent 201 is necessary. Typically, the predetermined value $N_0$ corresponds to an integration value of the engine revolution when the vehicle has run for one hour at 40 km/h.

At step 113, the flag f is set to 1 to indicate that the regeneration is in operation, and at step 114, the exhaust control valve 46 is opened and a voltage is applied to the electric heater 75. The exhaust control valve 46 is opened gradually due to the affect of the restriction 202 and the electric heater 75 generates heat to cause the unpleasant odor components to be released or burned. At step 115, it is determined whether two minutes has passed since the activation of the electric heater 75, and the program ends the routine of that cycle after two minutes has passed.

After the regeneration of the smell absorbent has started, the program proceeds from step 111 to step 115, since the flag f is set to 1, and steps 116 to 119 are carried out when two minutes has passed. At step 106, the supply of voltage to the electric heater 75 is stopped, and then at step 117, the exhaust control valve 46 is closed, and at step 118, the flag f is reset to 0. Finally at step 119, the integration revolution value $N_1$ is reset to 0 and the routine is ended.

In this second embodiment, the unpleasant odor components can be removed in addition to the effect obtained by the first embodiment.

Figure 7:
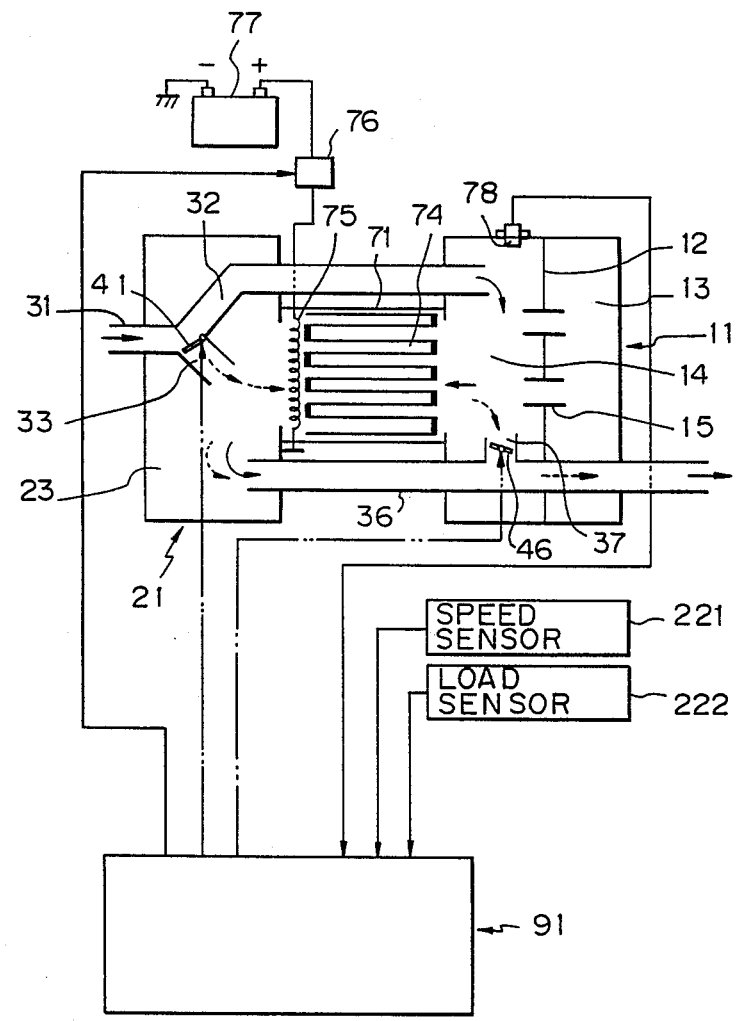
FIG. 7 is a schematic view of an exhaust gas purifying apparatus according to the third embodiment of the present invention.

FIG. 7 shows the third embodiment of the present invention. Note, only the structural portions that differ from those of the first embodiment are described hereafter. The first casing is provided with the separating wall 22 which separates the first expansion chamber into the first remote side expansion chamber 13 acting as a resonance chamber and the first near side expansion chamber 14, and the second casing 21 is provided with the single second expansion chamber 23 without a separating wall. The main inlet pipe 32 communicates with the first remote side expansion chamber 13 and the inlet pipe 31 is essentially one pipe with the main inlet pipe and the inlet bypass pipe 33 is branched from the main inlet pipe 32 within the second casing 21, different to the first embodiment in which the inlet pipe 31 is branched into the main inlet pipe 32 and the inlet bypass pipe 33 on the exterior of the second casing 21. The inlet control valve 41 is arranged at the branch point, and thus can be used to selectively open or close the main inlet pipe 32 and the inlet bypass pipe 33. The main outlet pipe 36 is also one pipe and the exhaust bypass pipe 37 is connected to the main outlet pipe 36 within the first near side expansion chamber 14 in the first casing 11. The exhaust control valve 46 is arranged in and opens or closes the exhaust bypass pipe 37.

Further, in this third embodiment, a target value for starting the regeneration of the filter element 74 is selected in accordance with the engine speed and the engine load, and accordingly, an engine revolution sensor 221 and a load sensor 222 are connected to the I/O port 92 of the ECU 91. The other arrangements are similar to those of the first embodiment.

In a normal trapping operation, the inlet control valve 41 and the exhaust control valve 46 close the inlet bypass pipe 33 and the exhaust bypass pipe 37, so that the exhaust gas flows from the main inlet pipe 32 into the first casing 11 and through the filter element 74 and the second casing to the outside atmosphere by the main outlet pipe 36, as indicated by the solid arrow in FIG. 7. To regenerate the filter element 74, the electric heater 75 is activated to generate heat and the inlet control valve 41 opens the inlet bypass pipe 33 and closes the main inlet pipe 32. The exhaust control valve 46 opens the exhaust bypass pipe 37, and thus the exhaust gas flows from the inlet bypass pipe 33 into the second expansion chamber 23, as indicated by the broken arrow in FIG. 7. A portion of the exhaust gas flows through the filter element 74 into the first remote side expansion chamber 14, and flows therefrom through the exhaust bypass pipe 37 and the main outlet pipe 36 to the outside atmosphere. The remaining portion of the exhaust gas flows directly from the second expansion chamber 23 through the main outlet pipe 36 to the outside atmosphere. The particulates deposited on the filter element 74 are burned. Note, the flow resistance of the main outlet pipe 36 and the degree of opening of the exhaust control valve 46 are regulated so that the amount of exhaust gas that flows through the filter element 74 is about one tenth of the total amount of exhaust gas.

This arrangement of the third embodiment is even simpler than that of the first embodiment, since the main inlet pipe 32 and the main outlet pipe 36 are single pipes.

Figure 8:
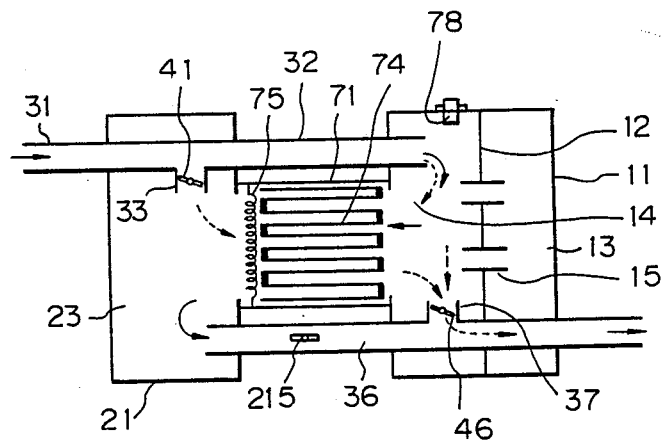
FIG. 8 is a schematic view of an exhaust gas purifying apparatus according to the fourth embodiment of the present invention.

FIG. 8 shows the fourth embodiment of the present invention. Note, only the structural portions that differ from those of the third embodiment are described hereafter. The inlet control valve 41 is arranged in the inlet bypass pipe 33 which is connected to the main inlet pipe 32, and the third control valve 215 is arranged in the main outlet pipe 36 upstream of the point at which the main outlet pipe 36 and the exhaust bypass pipe 37 are merged. In a normal trapping operation, the inlet control valve 41 and the outlet control valve 46 are closed, and the third control valve 215 is opened. The exhaust gas flows from the main inlet pipe 32 into the first casing 11 and through the filter element 74 and the second casing 21 to the outside atmosphere by the main outlet pipe 36, as indicated by the solid arrow in FIG. 8. To regenerate the filter element 74, the electric heater 75 is activated to generate heat, the inlet control valve 41 and the exhaust control valve 46 are opened, and the third control valve 215 is opened. Therefore, a portion of the exhaust gas flows from the inlet bypass pipe 33 into the second expansion chamber 23, and flows therefrom through the filter element 74 and the first remote side stage expansion chamber 14 to the outside atmosphere via the exhaust bypass pipe 37 and the main outlet pipe 36, as indicated by the broken arrow in FIG. 8. The remaining portion of the exhaust gas which does not flow through the filter element 74 flows directly from the main inlet pipe 32 into the first near side expansion chamber 14 and flows through the exhaust bypass pipe 37 and the main outlet pipe 36 to the outside atmosphere. The particulates deposited on the filter element 74 are burned and the filter element 74 is regenerated. The flow resistance of the main outlet pipe 36 and the degree of opening of the exhaust control valve 46 are regulated so that an amount of the exhaust gas that flows through the filter element 74 is about one tenth of the total amount of exhaust gas. The fourth embodiment has an effect similar to that of the third embodiment.

Figure 9:
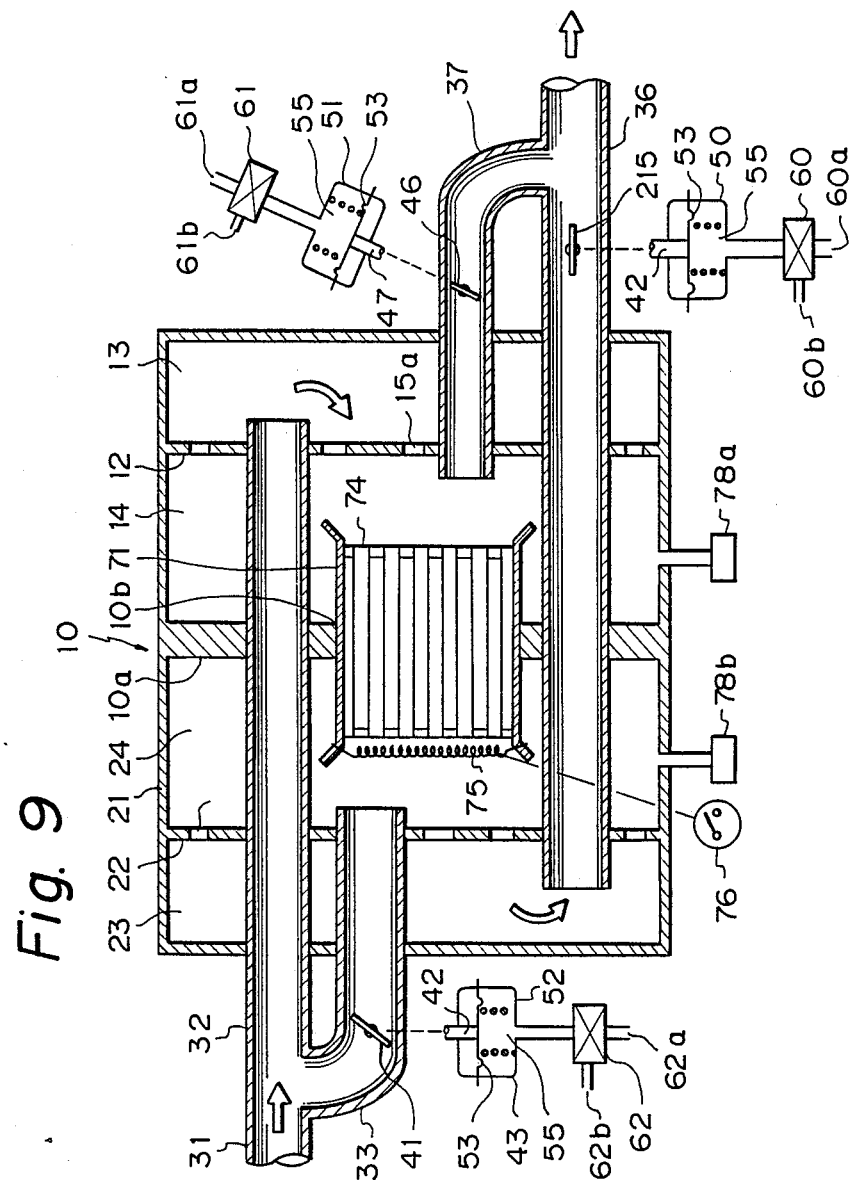
FIG. 9 is a sectional view of an exhaust gas purifying apparatus according to the fifth embodiment of the present invention.

FIG. 9 shows the fifth embodiment of the present invention. The muffler 10 is an exhaust apparatus receiving a high pressure exhaust gas and coverting same to a low pressure exhaust gas before discharge. To this end, the muffler 10 comprises several separating walls provided with numerous holes. The muffler 10 must effect this fundamental function on the one hand, but should have a small flow resistance on the other hand, since the engine output is reduced if the flow resistance is high. In the inventive exhaust gas purification apparatus built-in to the muffler 10, the main outlet pipe 36 is used during the normal trapping condition and during the regeneration of the filter element 74, and usually must have a larger diameter for normal use. But, if the flow resistance of the main outlet pipe 36 is low, most of the exhaust gas flows through the main outlet pipe 36 having a lower flow resistance during the regeneration of the filter element 74, and thus the flow rate of the exhaust gas passing through the filter element 74 is reduced. This embodiment solves this problem.

In this embodiment, the muffler 10 comprises a unit outer enclosure with a central bulkhead wall 10a forming the first casing 11 and the second casing 21. The first casing 11 is provided 1 herein with a separating wall 12, to form the first remote side and near side expansion chambers 13 and 14. A plurality of small holes 15a are provided in the separating wall 12 instead of the small pipes 15 of the first embodiment. The second casing 21 also is provided with a separating wall 22 having a plurality of small holes therein to form the second remote side and near side expansion chambers 23 and 24. The central bulkhead wall 10a has a central bore 10b, and the third casing 71 is fitted in the central bore 10b to allow communication between the first and the second expansion chamber, and fixed to the central bulkhead wall 10a by welding or another suitable means. The ceramic honeycomb type filter element 74 and the electric heater 75 are arranged in the third casing 71, and the pressure sensors 78a and 78b are arranged in the first and the second expansion chambers, respectively.

Figure 10:
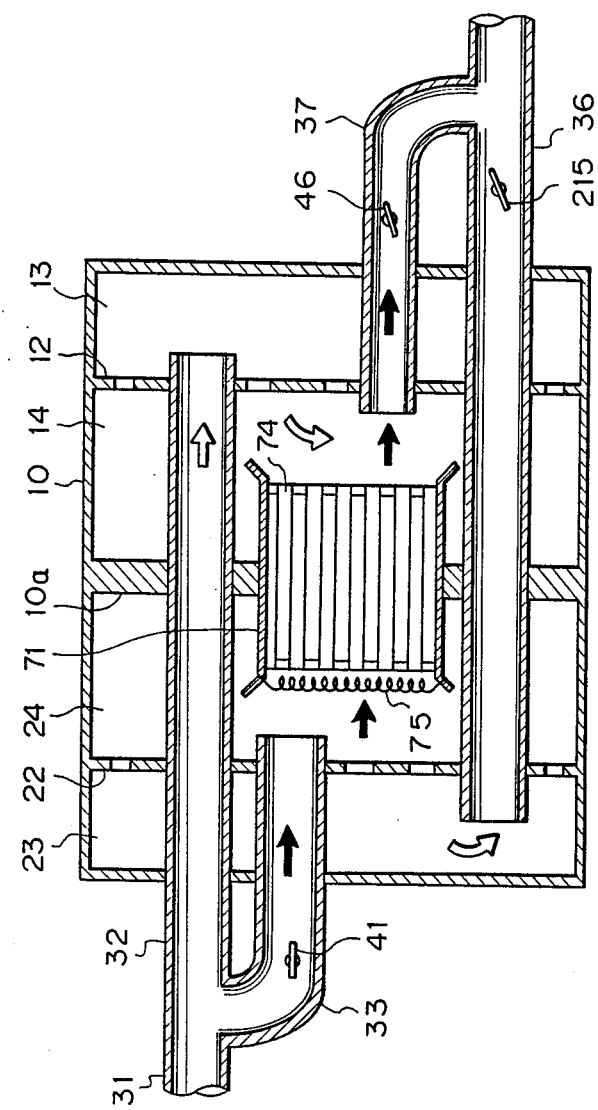
FIG. 10 is a sectional view of the apparatus of FIG. 9 in the filter regeneration condition.

The main inlet pipe 32 opens to the first remote side expansion chamber 13 and the main outlet pipe 36 opens to the second remote side expansion chamber 23. The inlet bypass pipe 33 is open to the second near side expansion chamber 24 and the outlet bypass pipe 33 extends from the first near side expansion chamber 14 to the main outlet pipe 36. The inlet control valve 41 is arranged in the inlet bypass pipe 33; the exhaust control valve 46 is arranged in the exhaust bypass pipe 37; and the third valve 215 is arranged in the main outlet pipe 36, as in the fourth embodiment of FIG. 8. Therefore, it is possible to constitute a flow of exhaust gas during normal trapping as indicated by the white arrow in FIG. 9, and to constitute two portions of a flow of the exhaust gas during the regeneration of the filter element 74 as indicated by the white arrow and the black arrow in FIG. 10; the black arrow showing the reverse flow through the filter element 74.

In this fifth embodiment, at least the third valve 215 is designed so that the opening thereof can be precisely controlled to throttle the flow of exhaust gas (white arrow in FIG. 10) through the main outlet pipe 36, to provide a back pressure to the reverse flow of the exhaust gas (black arrow in FIG. 10) through the filter element 74, whereby the exhaust gas flows through the filter element 74 at a desired flow speed. Preferably, the flow of the exhaust gas is controlled so that the amount of exhaust gas that flows through the filter element 74 is about one tenth of the total amount of exhaust gas. To this end, the third valve 215 is connected to a vacuum operated diaphragm actuator 50 and a vacuum supply means 60, similarly to those of the inlet control valve 41 and outlet control valve 46. The vacuum supply means 60 comprises a solenoid valve having a vacuum port 60a connected to a vacuum source (not shown), and an atmosphere port 60b, whereby a vacuum or atmospheric pressure is selectively supplied to the actuator 50. This vacuum supply means 60 can be controlled by duty signals so that at least the opening of the third valve 215 can be precisely controlled.

Figure 11:
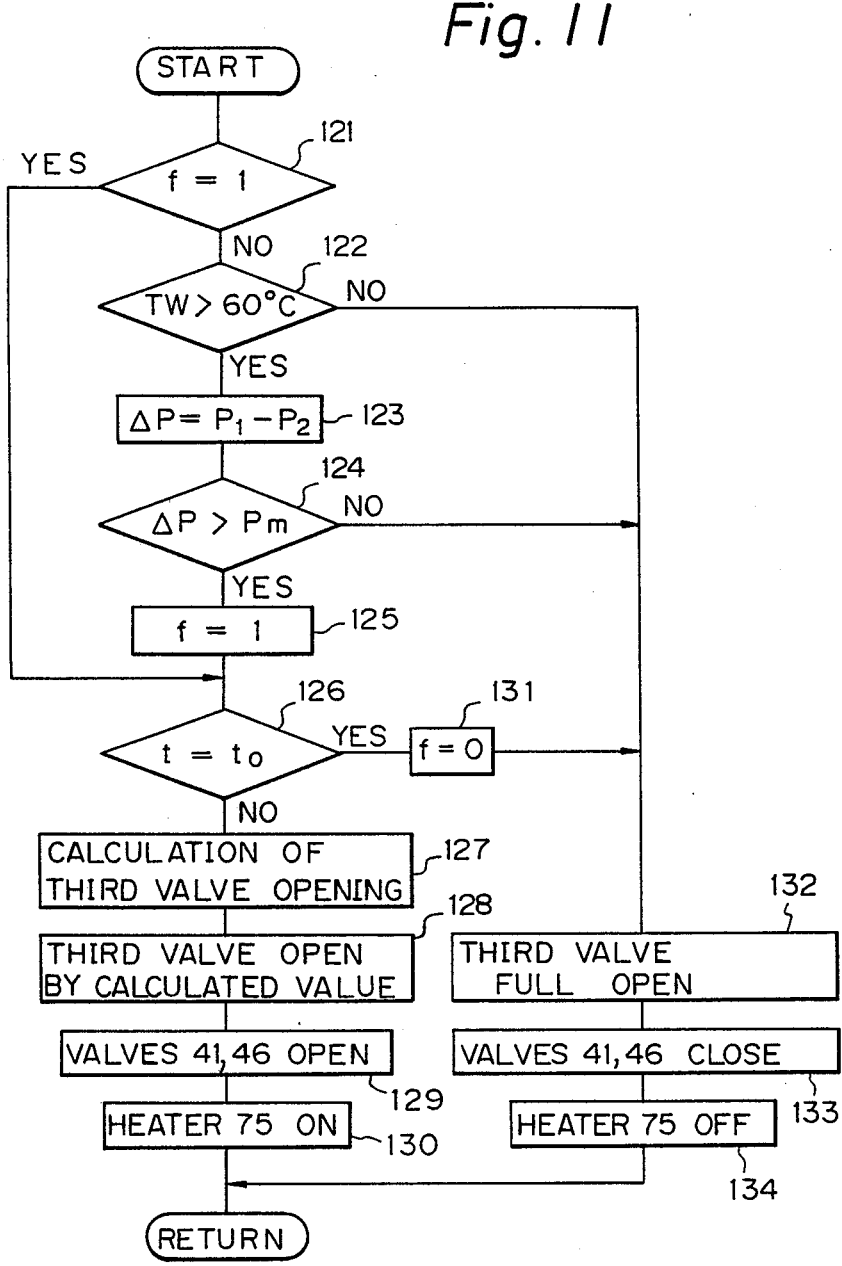
FIG. 11 is a flow chart of the filter regeneration routine carried out by the apparatus of FIG. 9.

FIG. 11 shows a flow chart of the regeneration routine of the filter element 74, which is similar to that of FIG. 4.

At step 121, it is determined whether or not a flag f is set to 1. The flag f is reset to 0 by the initialization processes of the ECU 91 and the program proceeds to step 122 where it is determined whether the temperature of the engine cooling water TW is greater than a predetermined value 60° C. If the result is NO, the program proceeds to step 132. If the result is YES, the program proceeds to step 123 and the pressure difference $\Delta P = P_1 - P_2$ is calculated, using the values $P_1$ and $P_2$ detected by the pressure sensors 78a and 78b upstream and downstream of the filter element 74. The pressure difference $\Delta P$ represents the rise of the back pressure of the filter element 74 in normal use, i.e., the extent of clogging of the filter element 74. Then at step 124, it is determined whether the pressure difference $\Delta P$ is greater than a reference value $P_m$. In this case, the reference value $P_m$ is stored in the memory as a map of the function of the engine speed and the engine load. If the pressure difference $\Delta P$ is greater than the reference value $p_m$, it is determined that the filter element 74 is clogged to a great extent and thus the filter element 74 must be regenerated.

If the result at steps 122 and 124 is NO, the program proceeds to step 132, at which the third valve 215 is fully opened. At step 133, the inlet control valve 41 and the outlet control valve 46 are closed, and at step 134, a voltage is not supplied to the electric heater 75.

If the result at step 124 is YES, the program proceeds to step 125 and the flag f is set to 1. Then at step 126, it is determined whether a predetermined time $t_0$ has passed from the setting of the flag f. If the predetermined time $t_0$ has passed, the program proceeds to step 131 and the flag f is reset to 0, since the regeneration of the filter element 74 is completed. If the result at step 126 is NO, i.e., the predetermined time $t_0$ has not passed, the program proceeds to step 127 to carry out the regeneration of the filter element.

At step 127, the degree of opening of the third valve 215 is calculated in accordance with the operating condition of the engine. Then at step 128, the third valve 215 is opened to the calculated degree. At step 129, the inlet control valve 41 and the exhaust control valve 46 are opened, and at step 130, a voltage is applied to the electric heater 75.

Figure 12:
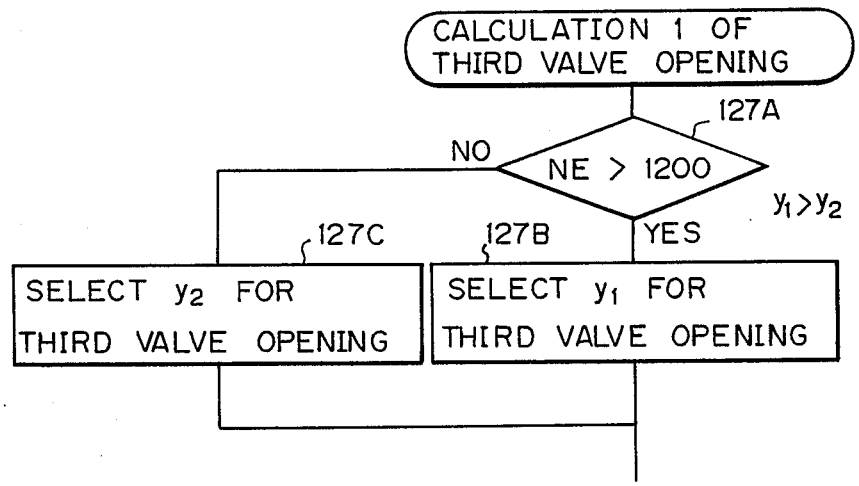
FIG. 12 is a flow chart of the first example of a part of FIG. 11, for calculating the opening of the adjustable third valve.
Figure 13:
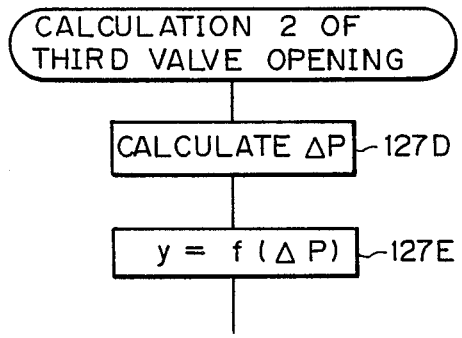
FIG. 13 is a flow chart of the second example of a part of FIG. 11, for calculating the opening of the adjustable third valve.

FIGS. 12 and 13 show examples of the calculation of the degree of opening of the third valve 215 in accordance with the operating condition of the engine, respectively. In the example of FIG. 12, the degree of opening of the third valve 215 is determined in accordance with the engine speed (step 127A), so that the degree $Y_1$ is selected when the engine speed NE is greater than 1200 revolutions per minute (step 127B), and the degree $Y_2$ is selected when the engine speed NE is less than 1200 revolutions per minute (step 127C). In this case, the degree $Y_1$ under the high speed condition is greater than the degree $Y_2$ under the low speed condition, and thus a greater portion of the exhaust gas is directly discharged through the main outlet pipe 36 under the high speed condition and a smaller portion of the exhaust gas is directly discharged through the main outlet pipe 36 under the low speed condition, to regulate the back pressure applied to the filter element 74 to a constant value to make the regenerating condition of the filter element 74 constant regardless of the varying engine operating conditions. Note, although only one reference engine revolutional speed is used in this example, it is possible to use a plurality of reference engine speeds and to carry out a step-by-step control of the degree of opening of the third valve 215. Also, it is possible to precisely control the degree of opening of the third valve 215.

In the example of FIG. 13, the pressure difference $\Delta P$ of the values $P_1$, and $P_2$ detected by the pressure sensors 78a and 78b upstream and downstream of the filter element 74 is used. At step 127D, the pressure difference $\Delta P$ is calculated, and at step 127E, the degree of opening Y of the third valve 215 is calculated. The degree of opening y of the third valve 215 is predetermined and stored as a function of the pressure difference $\Delta P$ or a map. Note, the relationship between the pressures upstream and downstream of the filter element 74 is reversed in accordance with the existence of the normal trapping condition or the filter regenerating condition. The degree of opening y of the third valve 215 in this example is determined so that the back pressure during the filter regenerating condition is controlled. Also, although the degree of opening of the third value 215 alone is regulated in the above described embodiment, preferably the outlet control valve 46 is controlled together with the third valve 215, since the outlet control valve 46 has an affect on the back pressure.

Figure 14:
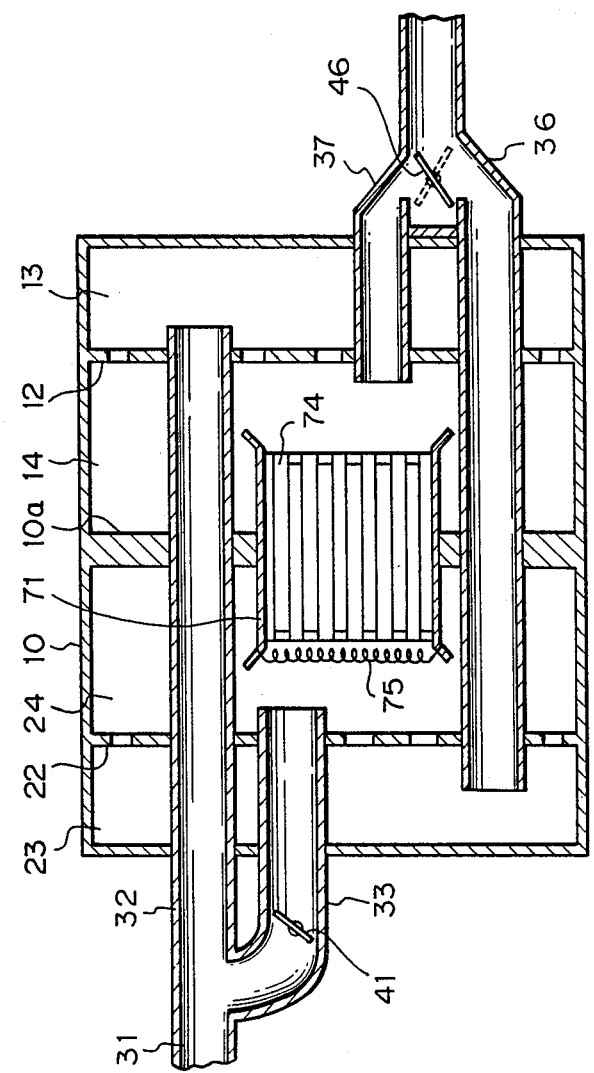
FIG. 14 is a sectional view of an exhaust gas purifying apparatus according to the sixth embodiment of the present invention.

FIG. 14 shows the sixth embodiment of the present invention. In this embodiment, the outlet control valve 46 is arranged at the junction of the main outlet pipe 36 and the exhaust bypass pipe 37, and cooperates with a valve seat arrangement provided at that junction so that the outlet control valve 46 can move between a first position in which it opens the main outlet pipe 36 and closes the exhaust bypass pipe 37, as shown by the solid line in FIG. 14, and a second position in which it projects into the main outlet pipe 36, to partly throttle the passage in the main outlet pipe 36, and opens the exhaust bypass pipe 37, as shown by the semibroken line in FIG. 14. This outlet control valve 46 can be moved precisely between the above described first and second positions by the actuator in the previous embodiment, and thus also effects the throttling function established by the third control valve 215 in the previous embodiment.

Figure 15:
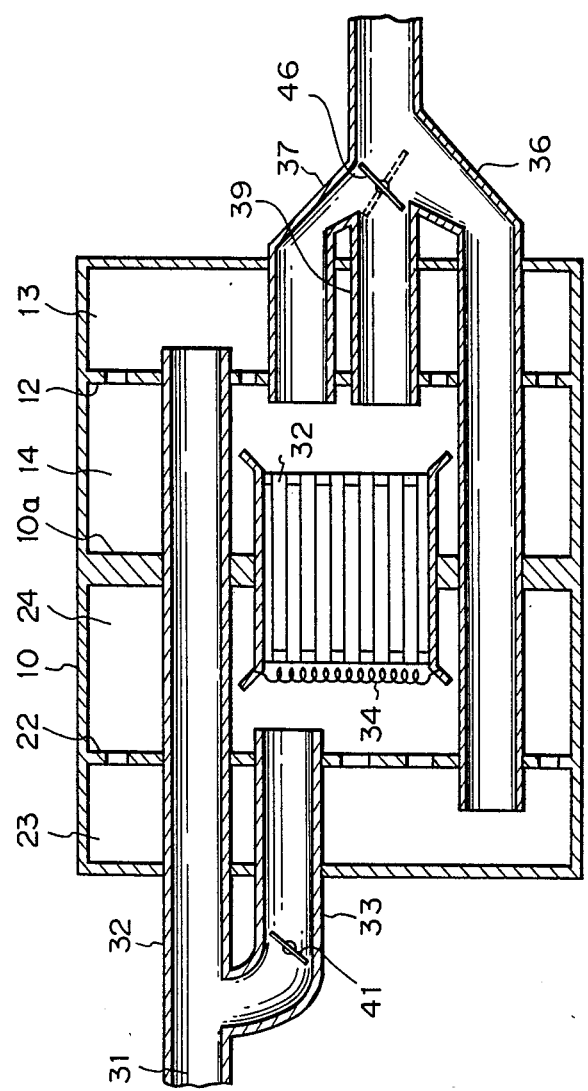
FIG. 15 is a sectional view of an exhaust gas purifying apparatus according to the seventh embodiment of the present invention.

FIG. 15 shows the seventh embodiment of the present invention. In this embodiment, a second outlet bypass pipe 39 open to the first remote side expansion chamber 14 is provided in parallel to the first exhaust bypass pipe 37, so that the second exhaust bypass pipe 39 and the first exhaust bypass pipe 37 converge at the main outlet pipe 36 to a common junction. The outlet control valve 46 is arranged at that junction among these pipes 36, 37, and 39, and cooperates with a valve seat arrangement provided at that junction so that the outlet control valve 46 can move between a first position in which it opens the main outlet pipe 36 and closes both the first and second exhaust bypass pipes 37 and 39, as shown by the solid line in FIG. 15, and a second position in which it opens the first exhaust bypass pipe 37 and projects into both the main outlet pipe 36 and the second exhaust bypass pipe 39 to partly throttle the passage in the main outlet pipe 36 and the second exhaust bypass pipe 39, as shown by the semi-broken line in FIG. 15. According to this embodiment, the diameter of the first exhaust bypass pipe 37 can be reduced in comparison with that of the embodiment of FIG. 14, in which the exhaust bypass pipe 37 in FIG. 14 must have a larger diameter to compensate for any reduction of the engine output due to the throttling action of the main outlet pipe 36 during the regeneration of the filter element 74, and thus a compact outlet control valve 46 and non-leakable valve seat arrangement can be obtained.

Figure 18:
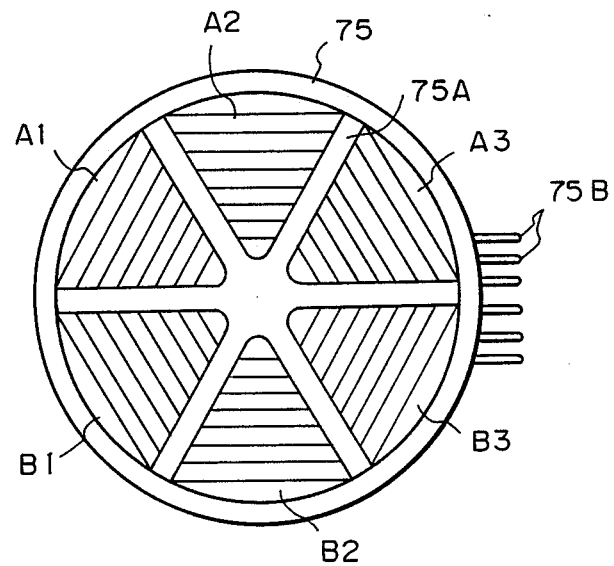
FIG. 18 is a front view of the heater of FIG. 16.
Figure 16:
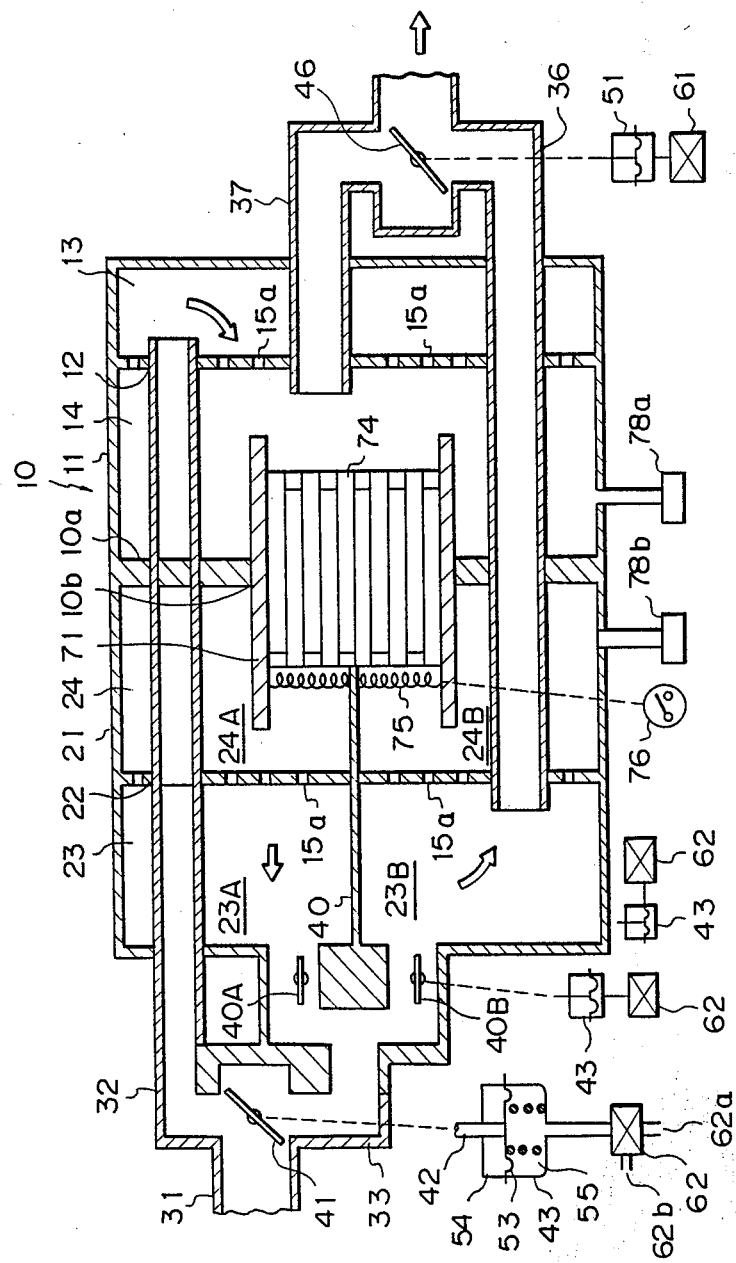
FIG. 16 is a sectional view of an exhaust gas purifying apparatus according to the eighth embodiment of the present invention.
Figure 17:
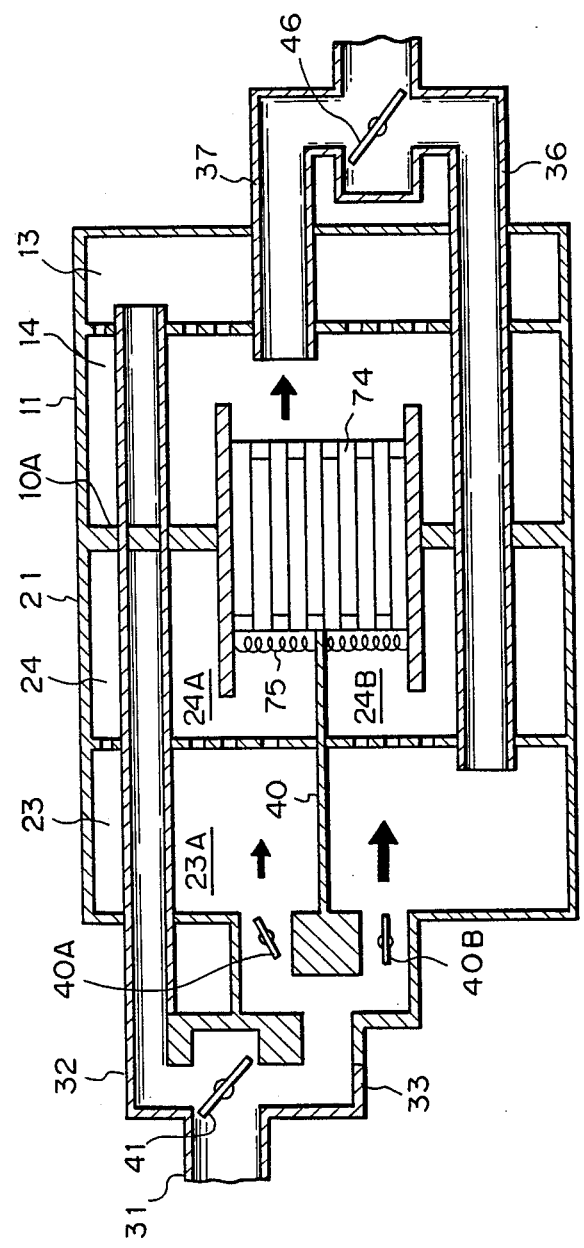
FIG. 17 is a sectional view of the apparatus of FIG. 16 in the filter regeneration condition.

FIGS. 16 to 18 show the eighth embodiment of the present invention. In the previous embodiments, a minor portion of the exhaust gas is made to flow in reverse through the filter element 74 during the regeneration thereof and most of the exhaust gas is discharged without passing through the filter element 74. This is advantageous in that particulates burn relatively slowly, and thus a sudden rise of the burning temperature does not occur, which prevents overheating of the filter element 74. Nevertheless, the slower and longer the burning process, the larger the amount of untreated exhaust gas discharged. This embodiment solves this problem.

FIG. 18 shows an example of the electric heater 75, which comprises six radially arranged insulators 75A and six resistor heating wires A1, A2, A3, B1, B2, and B3 each arranged between adjacent insulators 75A. Six outer terminals 75B are connected to the outer ends of the resistor heating wires, respectively, and the inner ends of the resistor heating wires are grounded. The outer terminals 75B can be connected to the relay 76 (FIG. 16) via leads (not shown) so that a voltage can be applied individually and sequentially to the resistor heating wires A1, A2, A3, B1, B2, and B3.

As shown in FIG. 16, the inlet bypass pipe 33 is open to the second remote side expansion chamber 23 and an axially extending bulkhead wall 40 is provided in the second remote side and near side expansion chambers 23 and 24 just in front of the electric heater 75. The bulkhead wall 40 extends axially from a position near the opening of the inlet bypass pipe 33 to a position near the end surface of the filter element 74, to separate the second expansion chamber into two partial passages 23A and 24A, and 23B and 24B. The bulkhead wall 40 is formed in such a manner that it diametrically separates the electric heater 75 (shown in FIG. 18) near the end surface of the filter element 74. For example, the bulkhead wall 40 separates the electric heater 75 into an A group of resistor heating wires A1, A2, and A3 and a B group of resistor heating wires B1, B2, and B3. The main outlet pipe 36 is open to one of the partial passages 23B but the exhaust gas can flow from both partial passages to the main outlet pipe 36, as shown in FIG. 16. The main outlet pipe 36 is closed in the condition shown in FIG. 17.

Partial flow control valves 40A and 40B are arranged in the partial passages 23A and 23B, respectively. These partial flow control valves 40A and 40B are opened when the inlet control valve 41 and the outlet control valve 46 are closed, as shown in FIG. 16, and only one of the partial flow control valves 40A and 40B is partially opened (partially open position) when the inlet control valve 41 and the outlet control valve 46 are opened, as shown in FIG. 17. These partial flow control valves 40A and 40B are connected to the actuators 43 and the vacuum supply means 62, which can be controlled by duty signals.

The operation of the apparatus of FIGS. 16 to 18 will be described with reference to FIG. 19.

Figure 19:
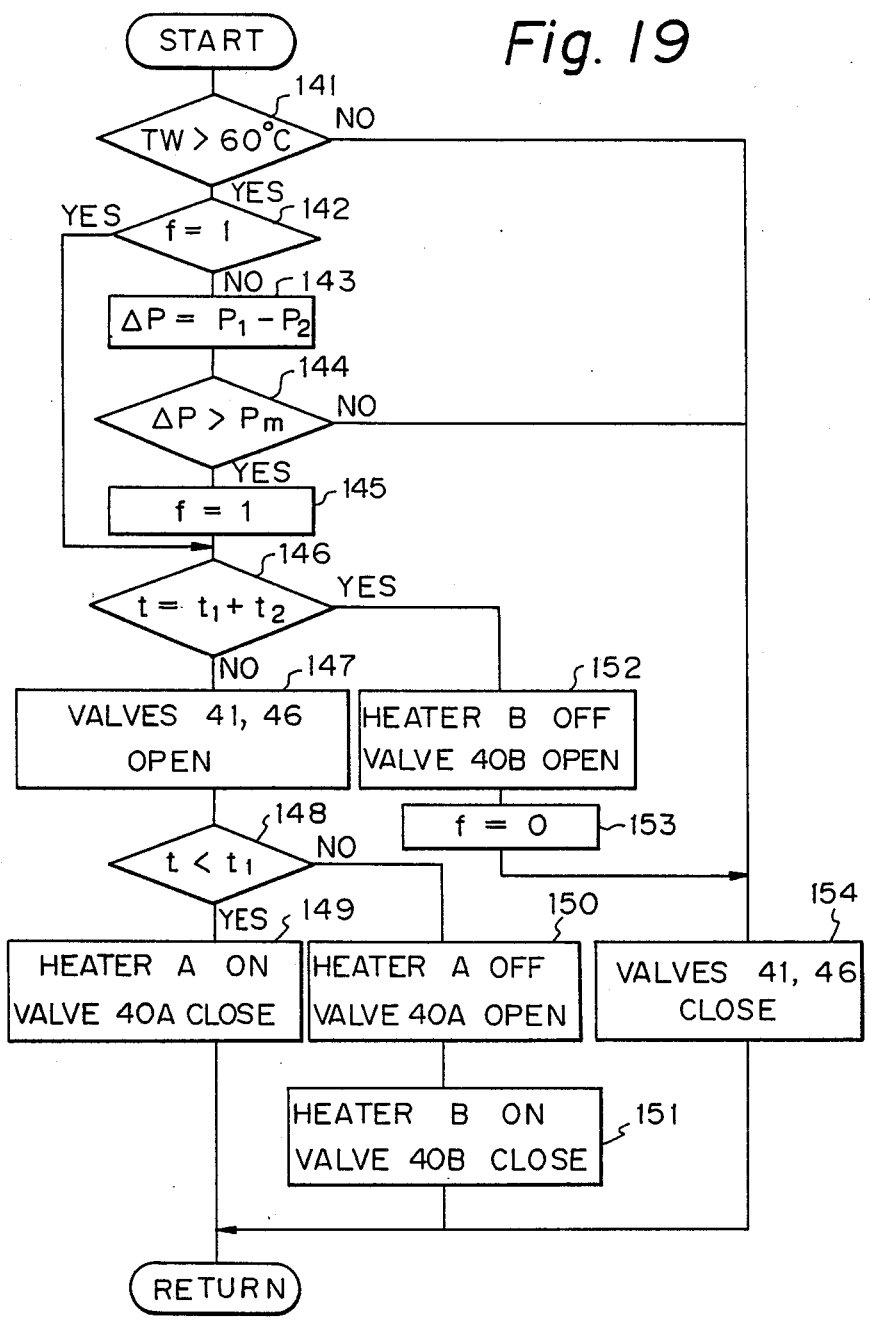
FIG. 19 is a flow chart of the filter regeneration routine carried out by the apparatus of FIG. 16.

FIG. 19 is a flow chart of the regeneration routine of the filter element 74. At step 141, it is determined whether the temperature of the engine cooling water TW is higher than the predetermined 60° C. If the result is YES, the program proceeds to step 142 and if the result is NO, proceeds to step 154. At step 142, it is determined whether or not a flag f is set to 1. If the result is YES, the program proceeds to step 146 and if the result is NO, proceeds to step 143. At step 143, the pressure difference $\Delta P$ is calculated, and at step 144 it is determined whether the pressure difference $\Delta P$ is greater than a predetermined value $P_m$. If the result is YES, the program proceeds to step 145 and if the result is NO, proceeds to step 154 at which the inlet control valve 41 and the outlet control valve 46 are closed. At step 145, the flag f is set to 1 to indicate that the regenerating operation is underway.

At step 146, it is determined whether a predetermined time $t_1+t_2$ has passed since the setting of the flag f. If the result is YES, the program proceeds to step 152, and if the result is NO, proceeds to step 147. At step 147, the inlet control valve 41 and the outlet control valve 46 are opened to cause a reverse flow of the exhaust gas through the filter element 74. Then at step 148, it is determined whether the elapsed time t is less than a predetermined first time $t_1$. If the result is YES, the program proceeds to step 149 and if the result is NO, proceed to step 150. At step 149, the voltage is first applied to the A group of resistor heating wires A1, A2, and A3, and the corresponding partial flow control valve 40A is partially opened. The other partial flow control valve 40B is maintained in the fully open position, as shown in FIG. 17. Therefore, the flow rate of the exhaust gas in the partial passage 23A and 24A differs from that in the partial passages 24B and 23B. Typically, the flow rate of the exhaust gas in the partial passages 23A and 24A is one thirtieth of the total flow.

In this manner, a flame is produced downstream of the filter element 74, viewed in the normal flow direction, by applying a voltage to the A group of resistor heating wires A1, A2, and A3, which is not blown out by the reverse flow of exhaust gas in the partial passage 23A and 24A, and propagates along the wall structure of the filter element 74 in the upstream direction. The other portion of the exhaust gas flowing in the partial passages 23B and 24B does not cause a burning of the particulates, since a voltage is not applied to the corresponding B group of the resistor heating wires B1, B2, and B3, and thus the trapping of the particulates by the filter element 74 is continued.

For this burning operation, a method is known of sequentially activating the A group of the resistor heating wires A1, A2, and A3 one by one, at intervals of one minute, whereby a voltage is applied over a period of three minutes in total at step 149 of FIG. 19. Thereafter, the flame is naturally propagated to continue the regeneration of the filter element 74. The time period ($t_1$) necessary to complete the burning regeneration can be experimentally determined; for example, the regeneration is completed within twenty minutes. When the engine is accelerated during this regeneration process, the inlet control valve (partially opening the main inlet pipe 32) can be partially closed to reduce any pressure loss by the exhaust gas.

If the result at step 148 is NO, the program proceeds to step 150, and the supply of voltage to the A group of the resistor heating wires A1, A2, and A3 is stopped (assuming that the voltage is continuously applied in this case) and the partial flow control valve 40A is fully opened. Then at step 151, a voltage is applied to the B group of the resistor heating wires B1, B2, and B3 and the corresponding partial flow control valve 40B is partially opened. As in the above described operation, if the time $t_2$ elapses, the result at step 146 will be YES, and thus the supply of voltage to the B group of the resistor heating wires B1, B2, and B3 is stopped and the corresponding partial flow control valve 40B is fully opened. Then, at step 153, the flag f is reset to 0 and the program proceeds to step 154.

If the operation of the engine is stopped before the result at step 146 becomes YES, the flag f and the remaining time are stored. The remaining regeneration process is continued when the result of step 141 becomes YES after the engine is restarted.

Figure 20:
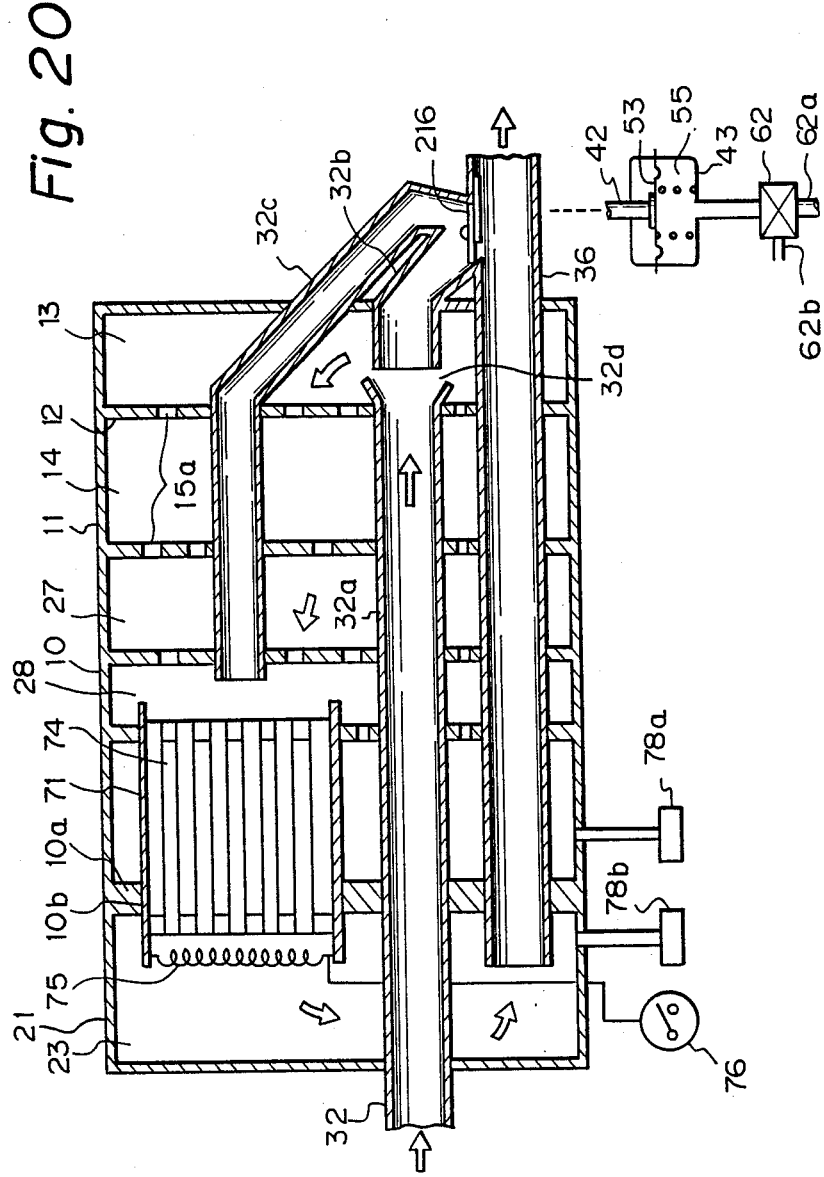
FIG. 20 is a sectional view of an exhaust gas purifying apparatus according to the ninth embodiment of the present invention.
Figure 21:
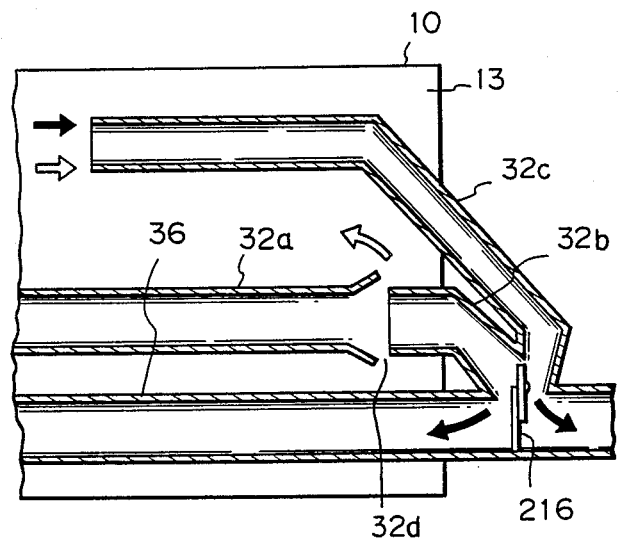
FIG. 21 is a sectional view of the apparatus of FIG. 20 in the filter regeneration condition.

FIGS. 20 and 21 show the ninth embodiment of the present invention, in which the regeneration of the filter element 74 can be effected by using only one flow control valve 216.

In this embodiment, the muffler 10 is provided with the bulkhead wall 10a which is offset to one side of the second expansion chamber to reduce the volume thereof and increase the volume of the first expansion chamber in which four expansion chambers 13, 14, 27, and 28 are formed by separating walls having small holes 15a. Therefore, the main function of the muffler 10 is effected at the first expansion chamber, and the extra increase of the pressure loss in the exhaust gas due to the provision of the filter element 74 is reduced.

As in the previous embodiments, the main inlet pipe 32 extends through the bulkhead wall 10a and opens into the first expansion chamber, and the main outlet pipe 36 extends from the second expansion chamber to the outside atmosphere. In this embodiment, the main inlet pipe 32 comprises a first inlet pipe portion 32a, a second inlet pipe portion 32b, and a third inlet pipe portion 32c. The first inlet pipe portion 32a and the second inlet pipe portion 32b are arranged in line so that the opening of the first inlet pipe portion 32a and the opening of the second inlet pipe portion 32b face each other, with a small clearance therebetween, to form an opening 32d of the main inlet pipe 32. The opening of the first inlet pipe portion 32a is spread so that a portion of the exhaust gas flows directly into the first expansion chamber and the remaining exhaust gas flows into the first expansion chamber through the second inlet pipe portion 32b and the third inlet pipe portion 32c having an opening facing the filter element 74. Alternatively, the opening 32d can be a hole in the main inlet pipe 32 formed if the pipe is a unit structure, but the opening 32d can be omitted as shown in the tenth embodiment of FIG. 23.

The area between the second inlet pipe portion 32b and the third inlet pipe portion 32c merges with the main outlet pipe 36 at a single merging point, and the third inlet pipe portion 32c further extends separately from the main outlet pipe 36 into the first expansion chamber. The flow control valve 216 is arranged at this merging point. The flow control valve 216 is formed in the shape of a disk-shaped butterfly valve with an additional circular plate added thereto.

The flow control valve 216 moves between a first position, as shown in FIG. 20, and a second position, as shown in FIG. 21. In the first position, the flow control valve 216 blocks the communication between the main inlet pipe 32 and the main outlet pipe 36 (by closing the openings of the second inlet pipe portion 32b and the third inlet pipe portion 32c to the main outlet pipe 36), and opens the main outlet pipe 36, to thereby allow the exhaust gas to flow from the first expansion chamber through the filter element 74 and the second expansion chamber 23 to the main outlet pipe 36, as indicated by the white arrow in FIG. 20. In the second position, the flow control valve 216 allows at least a partial communication between the main inlet pipe 32 and the main outlet pipe 36 (by partially closing the main outlet pipe 36, connecting the second inlet pipe portion 32b to the main outlet pipe 36 upstream of the merging point, and connecting the third inlet pipe portion 32c to the main outlet pipe 36 downstream of the merging point) to cause a reverse flow of the exhaust gas through the filter element 74 while the filter element 74 is regenerated, as indicated by the black arrow in FIG. 21. In this embodiment, a portion of the exhaust gas flows directly into the first expansion chamber and is discharged from the third inlet pipe portion 32c, as indicated by the white arrow in FIG. 21.

Figure 22:
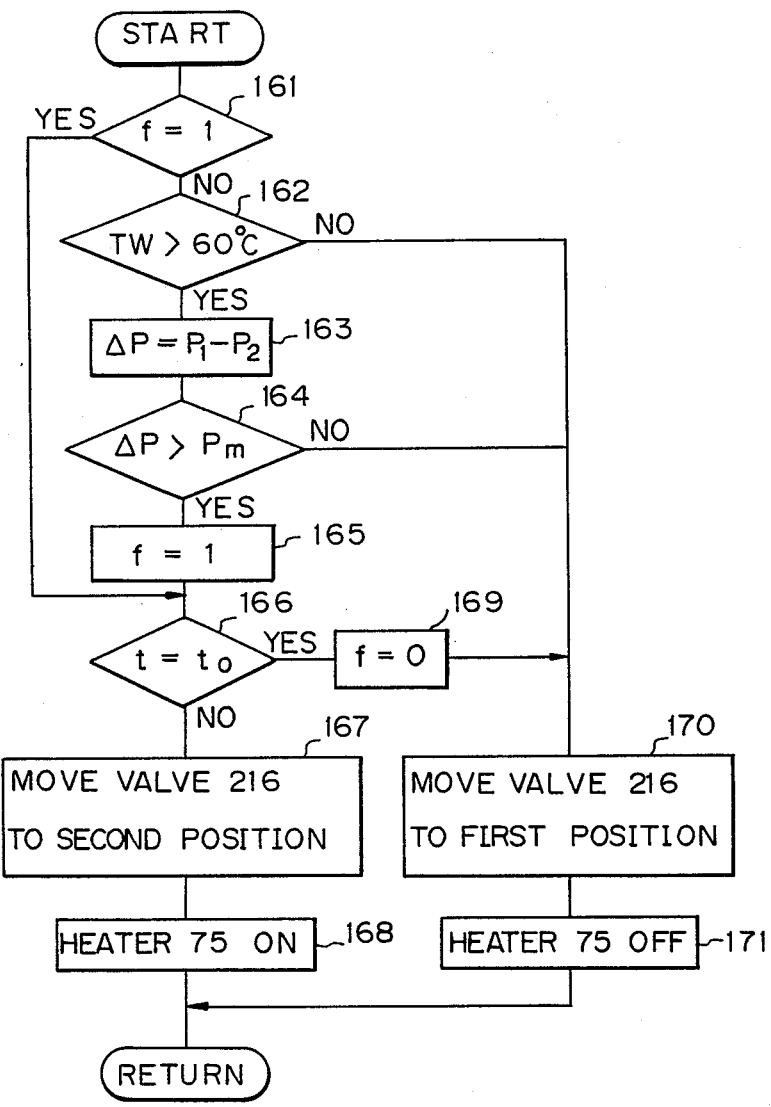
FIG. 22 is a flow chart of the filter regeneration routine carried out by the apparatus of FIG. 21.

FIG. 22 is a flow chart of the regeneration routine of the filter element 74, and includes steps similar to those of the previous embodiments. Namely, at step 161, it is determined whether or not a flag f is set to 1, and at step 162, it is determined whether the temperature of the engine cooling water TW is higher than the predetermined 60° C. At step 163, the pressure difference ΔP is calculated, and at step 164, it is determined whether the pressure difference ΔP is greater than a predetermined value Pm. At step 165, the flag f is set to 1 to indicate that the regenerating operation is underway. At step 166, it is determined whether a predetermined time $t_0$ has passed, and at step 169, the flag f is reset to 0.

If the result at step 166 is NO, the program proceeds to step 167. At step 167, the flow control valve 216 is moved to the second position to carry out the regeneration of the filter element 74. Then at step 168, a voltage is applied to the electric heater 75. If the result at step 166 is YES, the program proceeds to step 170, and the flow control valve 216 is moved to the first position to allow a normal flow of the exhaust gas. Then at step 168, the supply of voltage to the electric heater 75 is stopped.

Figure 23:
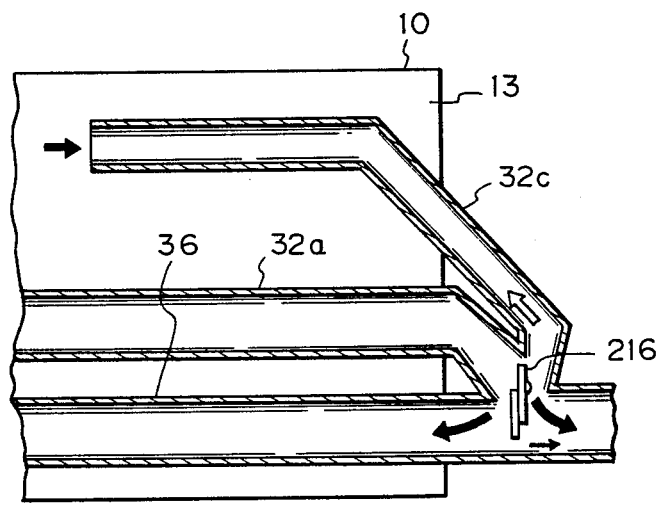
FIG. 23 is a sectional view of an exhaust gas purifying apparatus according to the tenth embodiment of the present invention.

In the tenth embodiment of FIG. 23, a first inlet pipe portion 32a is extended to merge with the main outlet pipe 36, and thus the second inlet pipe portion 32b and opening 32d are omitted. Therefore, all of the exhaust gas is introduced into the first expansion chamber through the third inlet pipe portion 32c and discharged from the main outlet pipe 36 during a normal operation, when the flow control valve 216 is in the first position. During the regeneration of the filter element 74, when the flow control valve 216 is in the second position, the exhaust gas is introduced into the second expansion chamber through the first inlet pipe portion 32a and the main outlet pipe 36, flows through the filter element 74, and is discharged from the third inlet pipe portion 32c and the main outlet pipe 36. Further, the flow control valve 216 does not fully close the main outlet pipe 36, and therefore, the exhaust gas introduced from the first inlet pipe portion 32a into the main outlet pipe 36 flows partly into the second expansion chamber and flows partly toward the downstream side of the main outlet pipe 36, by leaking from the flow control valve 216. Therefore, it is possible to control the rate of the reverse flow of exhaust gas through the filter element 74.

FIGS. 24 and 26 show the eleventh embodiment of the present invention, in which the smell absorbent 201 is arranged in the muffler 10 in series with the filter element 74, as in the second embodiment of FIG. 5. Japanese Unexamined Patent Publication No. 62-178708 discloses the arrangement of the smell absorbent in series with the filter element, although the filter element is not built-in to the muffler in this publication, and a normal flow of the exhaust gas normally through the filter element and the smell absorbent and a reverse flow of the exhaust gas through the smell absorbent and the filter element during the regeneration of the filter element. The problem arising with this apparatus is that attrition particles break off of the smell absorbent, due to the vibration of the engine or other reasons, and are carried to the filter element during the regeneration of the filter element, to cause a clogging of the filter element. This embodiment solves this problem.

In this embodiment, the second expansion chamber is separated into the second remote side expansion chamber 23 and the second near side expansion chamber 24 by the separating wall 22, and the smell absorbent 201 is arranged in the second remote side expansion chamber 23. The separating wall 22 is provided at the upper portion thereof with a louver plate 25a having a plurality of holes, as shown in FIG. 25. The smell absorbent 201 comprises pellet components, such as active coals. Other components can be used for the smell absorbent 201, for example, a monolith type ceramic cordierite base with a gamma alumina- coating, or sepiolite or zeolite. The inlet bypass pipe 33 opens in the second near side expansion chamber 24 and a temperature sensor 223 is arranged at that chamber 24 for detecting the temperature of the exhaust gas. A portion 36a of the main outlet pipe 36 is surrounded by the smell absorbent 201 and provided with a plurality of small holes to allow a flow of the exhaust gas.

The inlet control valve 24 and the exhaust control valve 46 are closed during a normal operation, as shown in FIG. 24, and thus the exhaust gas flows from the first expansion chamber through the filter element 74 into the second near side expansion chamber 24. Then the exhaust gas flows upward toward the second near remote expansion chamber 24 through the upper louver plate 25a and downward in the second near remote expansion chamber 24, with the unpleasant odor component in the exhaust gas trapped in the smell absorbent 201, and thus, clean exhaust gas is discharged from the main outlet pipe 36 to the outside atmosphere. Since the exhaust gas flows downward in the second near remote expansion chamber 24, the exhaust gas must pass through the smell absorbent 201 and the trap action can be effectively carried out regardless of the height of the loaded smell absorbent 201.

The inlet control valve 24 and the exhaust control valve 46 are opened during the regeneration operation of the filter element 74, as shown in FIG. 26, and thus the exhaust gas flows separately from the main inlet pipe 32 and the inlet bypass 33, as described previously. Therefore, a portion of the exhaust gas flows from the inlet bypass pipe 33 into the second near remote expansion chamber 24, and is further separated therefrom; a portion of the exhaust gas flows in reverse through the filter element 74 to effect the reverse regeneration of the filter element 74 with the activated electric heater 75, and the other portion flows normally through the smell absorbent 201. Therefore, the smell absorbent 201 is not overheated by the high temperature of the particulates on the filter element 74, and the filter element 74 is not clogged by attrition particles broken from the smell absorbent 201.

The smell absorbent 201 has an equilibrium absorption capacity and cannot absorb more than that capacity. If the vehicle is started when the smell absorbent 201 is at the equilibrium absorption capacity thereof, the unpleasant odor component is instantaneously purged from the smell absorbent 201 around the vehicle by the suddenly increase in exhaust gas. Such an undesirable purge is prohibited by the control procedure of FIG. 27.

Figure 27:
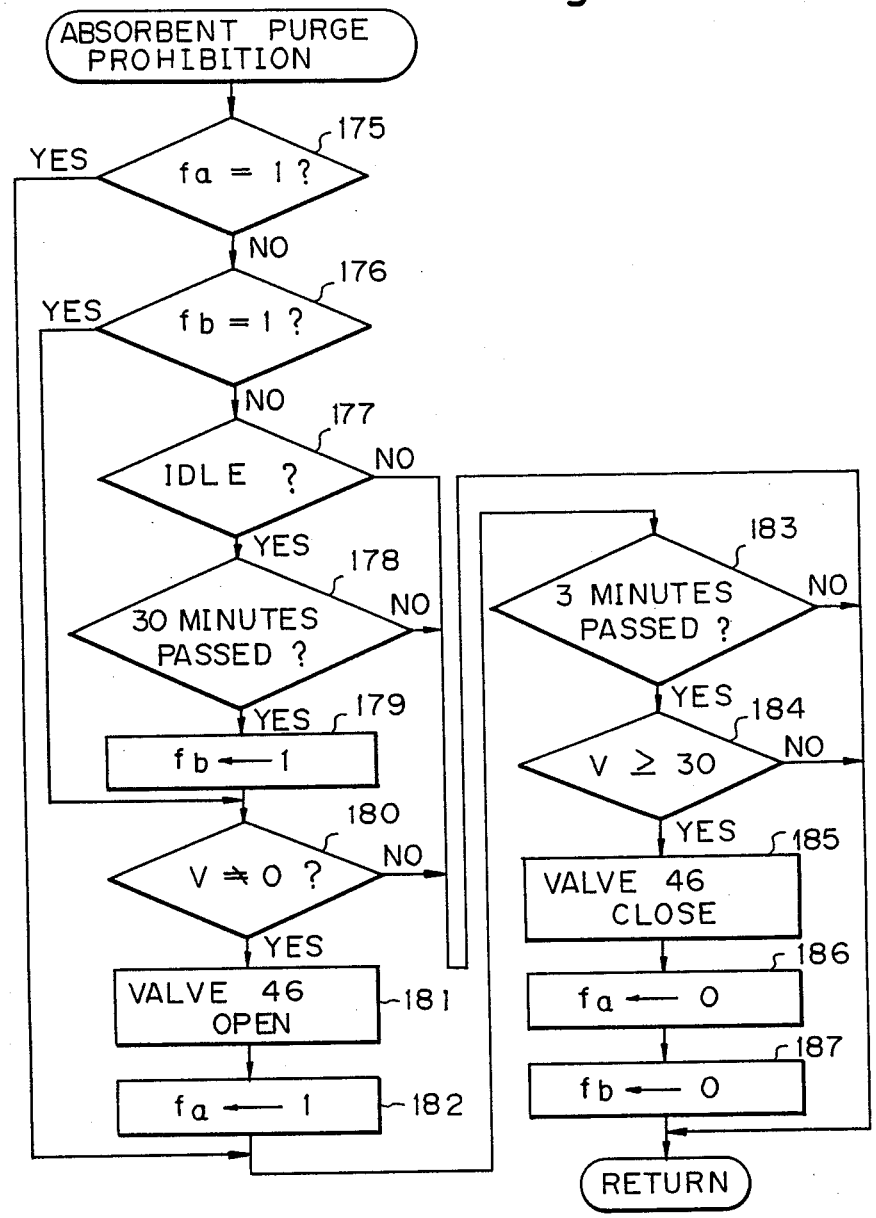
FIG. 27 is a flow chart of the smell absorbent purge prohibition routine carried out by the apparatus of FIG. 25.

FIG. 27 is a flow chart of the absorbent purge prohibition routine in which the purge is prohibited upon the start of the vehicle and is effected after a predetermined time has passed and when the vehicle is running at a middle or high speed. This routine is carried out independently of the regeneration of the filter element 74.

At step 175, it is determined whether or not a flag $f_a$ is set to 1; in this case, the flag $f_a$ is set to 1 when a purge of the smell absorbent 201 is prohibited. Normally the program will proceed to step 176 and the exhaust gas is introduced to the smell absorbent 201. At step 112, it is determined whether or not a flag $f_b$ is set to 1; in this case, the flag $f_{ab}$ is set to 1 when the smell absorbent 201 is at the equilibrium absorption capacity thereof. At step 177, it is determined whether or not the engine is in the idling condition, and at step 178, it is determined whether the engine has idled for more than thirty minutes. It is assumed that the smell absorbent 201 is at the equilibrium absorption capacity when the results of steps 177 and 178 are YES. Then at step 179, the flag $f_{ab}$ is set to 1.

At step 180, it is determined whether or not the speed of the vehicle is zero, i.e., whether the vehicle is running. If the result of step 180 is YES, the program proceeds to step 181 and the outlet control valve 46 is opened, and at step 182, the flag $f_a$ is set to 1. In this case, the inlet control valve 41 is kept open, so that the exhaust gas entering the first expansion chamber from the main inlet pipe 32 flows toward the outlet bypass pipe 37 having a low flow resistance, and thus the exhaust gas does not substantially flow through the smell absorbent 201 and a purge of the unpleasant odor component is prohibited.

At step 183, it is determined whether three minutes has passed since the prohibition of the purge, and at step 184, it is determined whether the speed V of the vehicle is higher than a predetermined middle value (for example, 30 km/h). When the results of step 183 and 184 are YES, the program proceeds to step 185 and allows the outlet control valve 46 to close. The exhaust gas then flows through the filter element 74 and the smell absorbent 201, and the smell absorbent 201 is purged naturally by the flow of the exhaust gas, in which the temperature of the exhaust gas becomes higher than temperature at the warming up of the engine, at which the smell is generated, and the equilibrium absorption capacity in the high temperature condition becomes smaller than that in the low temperature condition, causing the removal of the unpleasant odor component from the smell absorbent 201.

In this purging process, preferably the outlet control valve 46 is closed gradually, to carry out a slow purge and diffuse the smell component in the atmosphere, and for this purpose, preferably a restriction, such as the means 56 in FIG. 1, is provided and the check valve reversely oriented, between the actuator 51 for the outlet control valve 46 and the corresponding vacuum supply means 61. Finally, at steps 186 and 187, the flags $f_a$ and $f_b$ are reset to 0.

Figure 28:
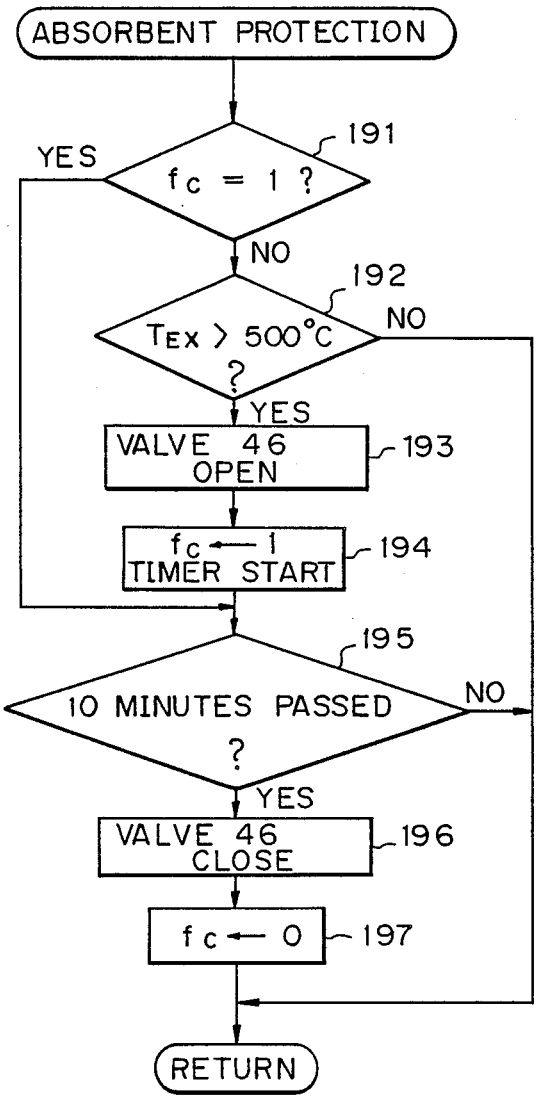
FIG. 28 is a flow chart of the smell absorbent protection routine carried out by the apparatus of FIG. 25.

Further, the smell absorbent 201 may be affected if the exhaust gas under a very high temperature (for example, 500° C.) is passed through the smell absorbent 201 for a long time. FIG. 28 is a flow chart of the absorbent protection routine to protect the smell absorbent 201 from such a high temperature condition. This routine can be carried out independently of the regeneration of filter element 74 and the absorbent purge protection.

At step 191, it is determined whether or not a flag $f_c$ set to 1 in this case, the flag $f_c$ is set to 1 when a protection of the smell absorbent 201 is carried out. At step 192, it is determined whether the temperature of the exhaust gas $T_{EX}$ is higher than a predetermined value (500° C.). If the result is YES, the program proceeds to step 193 and the outlet control valve 46 is opened to allow the exhaust gas to bypass the filter element and the smell absorbent 201, to protect the smell absorbent 201. Then at step 195, the flag $f_c$ is set to 1 and the protection timer is started. Then at step 195, it is determined whether the predetermined time (for example, 10 minutes) has passed. If the result is YES, the program proceeds to step 196 to close the outlet control valve 46 and to reset the flag $f_c$ to 0 at step 197. This protection process can be carried out intermittently while the temperature is very high, and for this purpose, the temperature sensor 223 in FIG. 24 outputs a high temperature signal when a high temperature exhaust gas exists but outputs a low temperature signal when the supply of the exhaust gas is stopped for the protection procedure, and continues to output a low temperature signal for a predetermined time after the protection procedure is completed until the temperature thereof is increased.

We claim:

1. An exhaust gas purifying apparatus built-in to a muffler for a diesel engine, said apparatus comprising:
   a first casing having a first expansion chamber formed therein;
   a second casing having a second expansion chamber formed therein in series with said first expansion chamber;
   at least one of said expansion chambers including a separating wall having a plurality of small holes;
   a third casing arranged between said first and second casings to form a passage between said first and second expansion chambers;
   an inlet pipe for introducing an exhaust gas from said engine into said first expansion chamber;
   an outlet pipe for discharging the exhaust gas from said second expansion chamber to the outside atmosphere;
   a filter arranged in said third casing to trap particulates in the exhaust gas flowing therethrough;
   an igniting means arranged adjacent to said filter on the side of said second expansion chamber to burn said particulate matter deposited on said filter, to regenerate said filter; and
   a flow control means arranged such that the exhaust gas normally flows from said first expansion chamber through said filter to said second expansion chamber and when said filter is regenerated at least a part of the exhaust gas is introduced from said inlet pipe into said second expansion chamber and flows in reverse from said second expansion chamber through said filter to said first expansion chamber to be discharged therefrom;

whereby said first and second casings constitute a muffler and said exhaust gas purifying apparatus is built-in to said muffler.

2. An apparatus according to claim 1, wherein said igniting means comprises an electric heater.

3. An apparatus according to claim 2, wherein said flow control means comprises an inlet bypass conduit connecting said inlet pipe to said second expansion chamber with an inlet control valve arranged therein, an exhaust bypass conduit connecting said first expansion chamber to one of said outlet pipe and the outside atmosphere with an exhaust control valve arranged therein, and a control means for causing said inlet control valve and said exhaust control valve to be normally closed and to be opened when the regeneration of said filter is required.

4. An apparatus according to claim 3, wherein vacuum operated actuators are provided for said inlet control valve and said exhaust control valve, respectively, and a vacuum delayed transmitting means is provided in a vacuum supply line for said exhaust control valve.

5. An apparatus according to claim 3, wherein said exhaust bypass conduit connects said first expansion chamber to said outlet pipe.

6. An apparatus according to claim 5, wherein a third control valve is provided in said outlet pipe upstream of a junction of said exhaust bypass conduit and said outlet pipe to control a flow of exhaust gas therethrough, to thereby control a flow rate of the exhaust gas flowing in reverse through said filter when a regeneration of said filter is required.

7. An apparatus according to claim 6, wherein vacuum operated actuators are provided for said inlet control valve, said exhaust control valve and said third control valve, respectively, at least one of said actuators for said third control valve being adjustable.

8. An apparatus according to claim 7, wherein said third control valve is adjustably controlled in response to a rotational speed of the engine.

9. An apparatus according to claim 7, wherein said third control valve is adjustably controlled in response to a pressure difference between the pressure of the exhaust gas upstream of said filter and the pressure of the exhaust gas downstream of said filter.

10. An apparatus according to claim 5, wherein said exhaust control valve is arranged at a junction of said exhaust bypass conduit and said outlet pipe to commonly control the flow of the exhaust gas through said exhaust bypass conduit and said outlet pipe.

11. An apparatus according to claim 10, wherein a second exhaust bypass conduit is provided to connect said first expansion chamber to said outlet pipe, said first and second exhaust bypass conduits converging at said junction, said exhaust control valve being arranged to commonly control the flow of the exhaust gas through said outlet bypass conduit, said first outlet pipe and said second outlet bypass conduit.

12. An apparatus according to claim 1, wherein said inlet pipe merges with said outlet pipe at a merging point and further extends separately into said first expansion chamber, and said flow control means comprises a control valve arranged at said merging point, said flow control means being movable between a first position in which a communication between said inlet pipe and said outlet pipe is blocked and a second position in which at least a partial communication between said inlet pipe and said outlet pipe is established to cause a reverse flow of the exhaust gas through said filter when a regeneration of said filter is required.

13. An apparatus according to claim 12, wherein said inlet pipe has at least one opening into said first expansion chamber upstream of said merging point.

14. An apparatus according to claim 1, wherein an axially extending bulkhead wall is provided in said second expansion chamber just in front of said heater to separate a plurality of axially extending exhaust gas passages, a flow control valve is provided in each of said exhaust gas passages, and said heater comprises a plurality of independently operable heater elements in correspondence with said exhaust gas passages, said flow control valve narrowing one of said exhaust gas passages in which the corresponding heater element is active.

15. An apparatus according to claim 1, wherein a smell absorbent means is provided in said second expansion chamber in series with said filter.

16. An apparatus according to claim 15, wherein said second expansion chamber comprises at least two expansion chambers located on the near side and the remote side of said filter, respectively, with said smell absorbent means arranged in said remote side expansion chamber to which said outlet pipe is connected, and said flow control means comprises an inlet bypass conduit connecting said inlet pipe to said near side expansion chamber with an inlet control valve arranged therein, an exhaust bypass conduit connecting said first expansion chamber to one of said outlet pipe and the outside atmosphere with an exhaust control valve arranged therein, and a control means causing said inlet control valve and said exhaust control valve to be normally closed and to be opened when a regeneration of said filter is required.

17. An apparatus according to claim 16, wherein said control means causes said exhaust control valve alone to be opened to stop the flow of the exhaust gas through said filter toward said smell absorbent.

18. An apparatus according to claim 1, wherein said inlet pipe has a predetermined flow direction of exhaust gas, and said first casing and said second casing are axially aligned with each other, with said first casing located on the downstream side of said second casing as viewed from said predetermined flow direction, said inlet pipe extending through said second casing to said first casing and opening into said first expansion chamber in said first casing.

19. An exhaust gas purifying apparatus for a diesel engine, said apparatus comprising:

a first casing having a first expansion chamber formed therein;

a second casing having a second expansion chamber formed therein and in series with said first expansion chamber, at least one of said expansion chambers including a separating wall with a plurality of small holes;

a third casing arranged between said first and second casings to form a passage between said first and second expansion chambers;

an inlet pipe for introducing an exhaust gas from said engine into said first expansion chamber, said inlet pipe having a predetermined flow direction of exhaust gas, and said first casing and second casing being axially aligned with each other, with said first casing located on the downstream side of said second casing as viewed from said predetermined flow direction, said inlet pipe extending through said second casing to said first casing and opening into said first expansion chamber in said first casing;

an outlet pipe for discharging the exhaust gas from said second expansion chamber to the outside atmosphere, said outlet pipe extending through said first expansion chamber;

a filter arranged in said third casing to trap particulates in the exhaust gas flowing therethrough;

an igniting means arranged adjacent to said filter on the side of said second expansion chamber to burn said particulate matter deposited on said filter, to regenerate said filter; and a flow control means arranged such that the exhaust gas normally flows from said first expansion chamber through said filter to said second expansion chamber and when said filter is regenerated at least a part of the exhaust gas is introduced from said inlet pipe into said second expansion chamber and flows in reverse from said second expansion chamber through said filter to said first expansion chamber to be discharged therefrom.

20. An apparatus according to claim 19, wherein said separating wall is provided at least in said first expansion chamber, said inlet pipe extending through said separating wall in said first expansion chamber and opening in a part of said first expansion chamber beyond said separating wall.

21. An apparatus according to claim 19, wherein said separating wall is provided at least in said second expansion chamber, said outlet pipe opening in a part of said second expansion chamber on the downstream side of normal flow of exhaust gas.

22. An exhaust gas purifying apparatus built-in to a muffler for a diesel engine, said apparatus comprising:

a first casing having a first expansion chamber formed therein;

a second casing having a second expansion chamber formed therein and in series with said first expansion chamber;

a third casing arranged between said first and second casings to form a passage between said first and second expansion chambers;

an inlet pipe for introducing an exhaust gas from said engine into said first expansion chamber;

an outlet pipe for discharging the exhaust gas from said second expansion chamber to the outside atmosphere;

a filter arranged in said third casing to trap particulates in the exhaust gas flowing therethrough;

an igniting means arranged adjacent to said filter on the side of said second expansion chamber to burn said particulate matter deposited on said filter, to regenerate said filter; and a flow control means arranged such that the exhaust gas normally flows from said first expansion chamber through said filter to said second expansion chamber and when said filter is regenerated at least a part of the exhaust gas is introduced from said inlet pipe into said second expansion chamber and flows in reverse from said second expansion chamber through said filter to said first expansion chamber to be discharged therefrom;

said flow control means comprising an inlet bypass conduit connecting said inlet pipe to said second expansion chamber with an inlet control valve arranged therein, an exhaust bypass conduit connecting said first expansion chamber to one of said outlet pipe and the outside atmosphere with an exhaust control valve arranged therein, and a control means for causing said inlet control valve and said exhaust control valve to be normally closed and to be opened when the regeneration of said filter is required;

whereby said first and second casings constitute a muffler and said exhaust gas purifying apparatus is built-in to said muffler.

23. An exhaust gas purifying apparatus built-in to a muffler for a diesel engine, said apparatus comprising:

a first casing having a first expansion chamber formed therein;

a second casing having a second expansion chamber formed therein and in series with said first expansion chamber;

a third casing arranged between said first and second casings to form a passage between said first and second expansion chambers;

an inlet pipe for introducing an exhaust gas from said engine into said first expansion chamber;

an outlet pipe for discharging the exhaust gas from said second expansion chamber to the outside atmosphere;

a filter arranged in said third casing to trap particulates in the exhaust gas flowing therethrough;

an igniting means arranged adjacent to said filter on the side of said second expansion chamber to burn said particulate matter deposited on said filter, to regenerate said filter; and a flow control means arranged such that the exhaust gas normally flows from said first expansion chamber through said filter to said second expansion chamber and when said filter is regenerated at least a part of the exhaust gas is introduced from said inlet pipe into said second expansion chamber and flows in reverse from said second expansion chamber through said filter to said first expansion chamber to be discharged therefrom;

said inlet pipe merging with said outlet pipe at a merging point and further extending separately into said first expansion chamber, and said flow control means comprising a control valve arranged at said merging point, said flow control means being movable between a first position in which a communication between said inlet pipe and said outlet pipe is blocked and a second position in which at least a partial communication between said inlet pipe and said outlet pipe is established to cause a reverse flow of the exhaust gas through said filter when a regeneration of said filter is required;

whereby said first and second casings constitute a muffler and said exhaust gas purifying apparatus is built-in to said muffler.

24. An apparatus according to claim 23, wherein said inlet pipe has at least one opening into said first expansion chamber upstream of said merging point.

* * * * *